(12) United States Patent
Konuma et al.

(10) Patent No.: US 8,212,968 B2
(45) Date of Patent: *Jul. 3, 2012

(54) LIQUID-CRYSTAL ELECTRO-OPTICAL APPARATUS AND METHOD OF MANUFACTURING THE SAME

(75) Inventors: Toshimitsu Konuma, Atsugi (JP); Takeshi Nishi, Atsugi (JP); Michio Shimizu, Kisarazu (JP); Harumi Mori, Atsugi (JP); Kouji Moriya, Atsugi (JP); Satoshi Murakami, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,339

(22) Filed: Jul. 30, 2009

(65) Prior Publication Data

US 2009/0284701 A1    Nov. 19, 2009

Related U.S. Application Data

(60) Continuation of application No. 12/500,026, filed on Jul. 9, 2009, and a continuation of application No. 11/806,739, filed on Jun. 4, 2007, now Pat. No. 7,561,246, and a division of application No. 09/059,562, filed on Apr. 14, 1998, now Pat. No. 7,227,603, and a division of application No. 08/592,672, filed on Jan. 26, 1996, now Pat. No. 5,818,557, and a division of application No. 08/278,088, filed on Jul. 20, 1994, now Pat. No. 5,594,569.

(30) Foreign Application Priority Data

Jul. 22, 1993  (JP) .................................... 5-201832
Jul. 27, 1993  (JP) .................................... 5-205887
Jul. 31, 1993  (JP) .................................... 5-209060
Mar. 27, 1994  (JP) .................................... 6-80939

(51) Int. Cl.
*G02F 1/1333* (2006.01)
*G02F 1/1339* (2006.01)
(52) U.S. Cl. ........................................ 349/84; 349/156
(58) Field of Classification Search .................. 349/191, 349/155–156, 33–34, 84–93, 123–133
See application file for complete search history.

(56) References Cited

U.S. PATENT DOCUMENTS 3,700,483 A    10/1972  Fullner et al.
(Continued)

FOREIGN PATENT DOCUMENTS

EP              0 404 575         12/1990
(Continued)

OTHER PUBLICATIONS

Chandani et al., Antiferroelectric Chiral Smectic Phases Responsible for the Tristable Switching in MHPOBC, Tokyo Inst. of Tech. Jun. 12, 1989, pp. 34-37.

(Continued)

*Primary Examiner* — Dung T. Nguyen
(74) *Attorney, Agent, or Firm* — Eric J. Robinson; Robinson Intellectual Property Law Office, P.C.

(57) ABSTRACT

A liquid crystal device comprising:
a pair of substrates having an electrode arrangement thereon;
an orientation control means provided on at least one of said substrates; and
a ferroelectric or antiferroelectric liquid crystal layer interposed between said substrates, said liquid crystal layer being uniaxially oriented by virtue of said orientation control means,
wherein means for suppressing an orientation control effect of said orientation control means with respect to said liquid crystal layer is provided between said liquid crystal layer and said orientation control means.

29 Claims, 11 Drawing Sheets

U.S. PATENT DOCUMENTS

| | | | |
|---|---|---|---|
| 3,982,820 A | 9/1976 | Hattori et al. |
| 4,640,583 A | 2/1987 | Hoshikawa et al. |
| 4,775,225 A | 10/1988 | Tsuboyama et al. |
| 4,796,979 A | 1/1989 | Tsuboyama |
| 4,911,958 A | 3/1990 | Mochizuki et al. |
| 4,932,757 A | 6/1990 | Hanyu et al. |
| 5,083,855 A | 1/1992 | Clark et al. |
| 5,189,540 A | 2/1993 | Nakamura et al. |
| 5,212,575 A | 5/1993 | Kojima et al. |
| 5,221,980 A | 6/1993 | Yamamoto et al. |
| 5,227,900 A | 7/1993 | Inaba et al. |
| 5,270,846 A | 12/1993 | Watanabe et al. |
| 5,305,126 A | 4/1994 | Kobayashi et al. |
| 5,327,271 A | 7/1994 | Takeuchi et al. |
| 5,332,521 A | 7/1994 | Yuasa et al. |
| 5,339,306 A | 8/1994 | Yoshinaga et al. |
| 5,354,497 A | 10/1994 | Fukuchi et al. |
| 5,357,356 A | 10/1994 | Konuma et al. |
| 5,372,745 A | 12/1994 | Yoshinaga et al. |
| 5,389,287 A | 2/1995 | Nishiyama et al. |
| 5,400,156 A | 3/1995 | Konuma et al. |
| 5,408,246 A | 4/1995 | Inaba et al. |
| 5,412,494 A | 5/1995 | Ishiwata et al. |
| 5,469,281 A | 11/1995 | Katakura et al. |
| 5,473,449 A | 12/1995 | Takemura et al. |
| 5,473,450 A | 12/1995 | Yamada et al. |
| 5,490,001 A | 2/1996 | Konuma |
| 5,525,273 A | 6/1996 | Konuma et al. |
| 5,528,401 A | 6/1996 | Narutaki et al. |
| 5,530,573 A | 6/1996 | Shimada |
| 5,540,858 A | 7/1996 | Yoshinaga et al. |
| 5,541,747 A | 7/1996 | Nishi et al. |
| 5,541,749 A | 7/1996 | Konuma et al. |
| 5,543,947 A | 8/1996 | Mase et al. |
| 5,546,208 A | 8/1996 | Shimizu et al. |
| 5,552,913 A | 9/1996 | Shimizu et al. |
| 5,566,009 A | 10/1996 | Yamazaki et al. |
| 5,594,569 A | 1/1997 | Konuma et al. |
| 5,600,457 A | 2/1997 | Shimizu et al. |
| 5,615,026 A | 3/1997 | Koden |
| 5,619,354 A | 4/1997 | Shimizu et al. |
| 5,638,194 A | 6/1997 | Yamada et al. |
| 5,673,127 A | 9/1997 | Takahara et al. |
| 5,739,882 A | 4/1998 | Shimizu et al. |
| 5,777,700 A | 7/1998 | Kaneko et al. |
| 5,818,557 A | 10/1998 | Konuma et al. |
| 6,195,139 B1 | 2/2001 | Yamazaki et al. |
| 6,618,105 B2 | 9/2003 | Yamazaki et al. |
| 7,561,246 B2 | 7/2009 | Konuma et al. |
| 2010/0085527 A1 | 4/2010 | Konuma et al. |

FOREIGN PATENT DOCUMENTS

| | | |
|---|---|---|
| EP | 0 484 972 | 5/1992 |
| JP | 62-007022 | 1/1987 |
| JP | 63-198024 | 8/1988 |
| JP | 01-055527 | 3/1989 |
| JP | 01-120532 | 5/1989 |
| JP | 02-137819 | 5/1990 |
| JP | 02-503360 | 10/1990 |
| JP | 03-223809 | 10/1991 |
| JP | 04-136814 | 5/1992 |
| JP | 04-243228 | 8/1992 |
| JP | 04-281425 | 10/1992 |
| JP | 04-362918 | 12/1992 |
| JP | 05-005905 | 1/1993 |
| JP | 05-045636 | 2/1993 |
| JP | 05-297364 | 11/1993 |
| JP | 06-040931 | 5/1994 |
| JP | 06-160812 | 6/1994 |
| JP | 06-160824 | 6/1994 |
| JP | 06-186533 | 7/1994 |
| JP | 06-214218 | 8/1994 |
| JP | 06-242409 | 9/1994 |
| JP | 06-289372 | 10/1994 |
| JP | 06-301015 | 10/1994 |
| JP | 06-301039 | 10/1994 |
| JP | 06-331948 | 12/1994 |
| JP | 06-337405 | 12/1994 |
| JP | 06-337418 | 12/1994 |
| JP | 06-347807 | 12/1994 |
| JP | 07-013143 | 1/1995 |
| JP | 07-318946 | 12/1995 |
| JP | 09-211462 | 8/1997 |
| WO | WO 88/008552 | 11/1988 |

OTHER PUBLICATIONS

Michio Shimizu et al., "Characteristic of a Novel Liquid Crystal Cell with Mixture of FLC and U.V. Curable Resin," Mol. Cryst. Liq. Cryst., Overseas Publishers Association, vol. 263, 1995, pp. 585-587.
Office Action (U.S. Appl. No. 12/631,908) dated Jul. 22, 2010.
Office Action (U.S. Appl. No. 12/500,026) Dated Dec. 7, 2010.
Office Action (U.S. Appl. No. 12/631,908) Dated Feb. 2, 2011.
Office Action (U.S. Appl. No. 12/500,026) dated May 27, 2011.
Notice of Allowance (U.S. Appl. No. 12/631,908) dated Oct. 13, 2011.
Office Action (U.S. Appl. No. 12/500,026) dated Oct. 27, 2011.
Notice of Allowance (U.S. Appl. No. 12/631,908) dated Apr. 12, 2012.

○: prior art
□: present invention

○: prior art
□: present invention

LIQUID-CRYSTAL ELECTRO-OPTICAL APPARATUS AND METHOD OF MANUFACTURING THE SAME

BACKGROUND OF THE INVENTION

1. Field of the Invention

The present invention relates to a liquid-crystal electro-optical device of a birefringence mode using a ferroelectric or antiferroelectric liquid-crystal material.

2. Description of the Related Art

Recently, attention is paid to liquid-crystal display devices (LCD). Among them, in particular, the liquid-crystal display devices of the twisted nematic (hereinafter referred to as "TN") type using nematic liquid crystal and the super twisted nematic (hereinafter referred to as "STN") type have been widely known and practically used.

Also, the liquid-crystal display devices of the active matrix type using the nematic liquid-crystal material in which a switching element such as a thin-film transistor (TFT) is provided for each pixel have been extensively developed as the device capable of performing high speed, high-contrast and multi-gradation display.

The fundamental structure of the liquid-crystal electro-optical device of the TN type and the STN type will be now described. An orientation film is coated on a substrate having an electrode, sintered and then subjected to rubbing as an orienting process to form a first substrate. Likewise, an orientation film is coated on a substrate having an electrode, sintered and subjected to rubbing to form a second substrate. The first and second substrates are provided so that the respective electrodes are opposed to each other, and liquid crystal is held between these substrates.

On contact surfaces between the respective substrates and a liquid-crystal layer, the liquid-crystal is aligned in a rubbing direction in accordance with a regulating force of rubbing. The rubbing directions of the upper and lower substrates are shifted from each other by 90° in the case of the TN-type device and by 200 to 290° in the case of the STN-type device. The liquid-crystal molecules in the vicinity of the middle of the liquid-crystal layer are aligned in the spiral form so that energy becomes smallest between the liquid-crystal molecules positioned at 90 to 290°.

These liquid-crystal molecules arrayed in the spiral form are rearranged in parallel with or perpendicular to a direction of an electric field due to the dielectric anisotropy of the liquid-crystal molecules by applying voltage across the liquid crystal layer, thereby to loose the spiral structure thereof. The transmitted light amount is changed in such a manner that, when the liquid-crystal molecules are perpendicular to the surface of the substrate, it exhibits a light state, whereas when the liquid-crystal molecules are in parallel therewith, it exhibits a dark state. Also, the state of such liquid-crystal molecules is continuously changed in accordance with the applied voltage, and the transmitted light amount is changed in accordance with the change of the state of the molecules. Therefore, a gradation between the bright (transmitted) state and the dark (non-transmitted) state, that is, a halftone is obtained by properly controlling applied voltage.

Obtaining the halftone is very effective in coloring, and the device can cope with full-coloring if a response speed of the liquid crystal is satisfactory.

The nematic liquid crystal has a low response speed of 100 msec, and therefore does not provide a sufficient characteristic for display of an animation or the like which requests a high-speed response.

Also, because the nematic liquid crystal has the fluidity, if the device is used in a standing state, the liquid crystal is gathered in a lower portion of the device, whereby the lower portion of a cell has such a shape as to be swelled. As a result, since the thickness of the cell is largely changed within the device, coloring or a color shade is produced, or the response of the liquid crystal is not uniform even though the same voltage is applied thereto.

Recently, because it is desired that the screen of the device is made large and the response speed thereof is made high, the above-mentioned problems of the nematic liquid crystal comes more serious.

On the other hand, the LCD using the ferroelectric liquid crystal has also been developed. The ferroelectric liquid crystal can perform switching operation at high speed of several tens μsec because the liquid-crystal molecules have spontaneous polarization. The ferroelectric liquid crystal or the antiferroelectric liquid crystal has spontaneous polarization, thereby to enable high-speed operation at such a response speed of several to several hundreds μsec. Thus, it responds at high speed more than about three digits.

In the liquid-crystal electro-optical device using the ferroelectric liquid crystal or the antiferroelectric liquid crystal, the liquid-crystal molecules can be oriented in accordance with a regulating force of orientation if at least one of substrates is subjected to an orientating process. These liquid-crystal molecules have a laminar structure in which they are regularly piled on each other from one surface of the substrate toward the other surface thereof. Also, they have a laminar structure in a direction parallel to the substrate.

Because of such layer structures, the ferroelectric liquid crystal or antiferroelectric liquid crystal is poor in fluidity, and in the case where the device is in a standing state, there is advantageous in that the thickness of the cell is kept constant, thereby to enable uniform display without liquid crystal being gathered in the lower portion of the device like in the case of a nematic liquid crystal.

Naturally, in an SmC* phase exhibited by the ferroelectric liquid crystal material, liquid crystals are oriented so that the long axis of the liquid-crystal molecules is inclined by a certain inclined angle with respect to a normal (almost parallel to the substrate) of a layer provided in the liquid-crystal material, and this forms a spiral structure in which the liquid-crystal molecules have the direction of orientation vector which is twisted from one layer toward another layer in a bulk state, and because the spontaneous polarization having the liquid-crystal molecules is offset as a whole, ferroelectricity cannot appear.

Therefore, there has been proposed a liquid-crystal electro-optical device of the so-called surface stabilizing type exhibiting ferroelectricity by Clerk. In the fundamental structure, the ferroelectric smectic liquid-crystal material is held between a pair of substrates having the electrodes, and the liquid-crystal molecules are arranged in parallel with the substrate and optically uniaxially oriented so that a layer having a liquid-crystal material is formed perpendicular to the substrate or inclined with respect to the substrate. At this time, an interval between the pair of substrates is set to about 1 μm so that the spiral structure taken by the liquid-crystal material in the bulk state is loosened. Further, as a result of loosing the spiral structure, the directions of the orienting vectors taken by the liquid-crystal molecules are in two stable orienting states, that is, bistable orienting states.

With the above-mentioned structure, the polarity of an electric field applied to a pixel electrode is inverted so that a high-speed response can be made between the above-mentioned two states by torque resulting from a product of spontaneous polarization possessed by the liquid crystal and the electric field applied by the electrodes.

The orientation of the spontaneous polarization possessed by the liquid-crystal molecules per se is changed by 180° (hereinafter referred to as "inversion") by applying voltage between the substrates. The liquid-crystal molecules has an orientation which is changed by a certain angle with respect to the optically uniaxially orienting direction, and the orientation of the liquid-crystal molecules is inverted by applying voltage, thereby to perform switching operation from a bright (transmission) state to a dark (non-transmission) state, or from the dark state to the bright state.

Since the liquid-crystal electro-optical device using nematic, ferroelectric or antiferroelectric liquid crystal utilize the optical anisotropy of the liquid molecules, it has polarizing plates outside of both the substrates to obtain an electro-optical characteristic.

In the case of using the ferroelectric or antiferroelectric liquid-crystal material, an optical axis of one polarizing plate is matched with a direction in which one orienting state is exhibited in either of two stable states, and the other polarizing plate is disposed so as to be optically axially perpendicular to the one polarizing plate.

As a method of uniaxially orienting the liquid-crystal molecules, there has been known a method of forming a means for providing an orienting regulating force, which makes the liquid-crystal material uniaxially oriented (hereinafter referred to as "uniaxial orientation means"), on a surface which is in contact with the liquid-crystal material of the substrates, between which the liquid crystal is held. The rubbing method has been typically known. The rubbing method is a method in which an orientation film having a thickness of 100 to 500 Å, which is usually made of organic macromolecules or the like, is formed on a surface having the electrode of the substrate, and the surface of the orientation film is rubbed with cloth or the like in one direction (rubbing process), thereby to provide an optically uniaxially orienting regulating force which allows the liquid-crystal molecules to be arranged on the orientation film in one direction. The surface of the substrate or the electrode may be directly subjected to the rubbing process. The rubbing method is widely used in the TN-type or STN-type liquid crystal electro-optical device using the nematic liquid crystal, and also most generally used in the ferroelectric liquid crystal as an excellent orienting method which is simple and easy in making the area of the liquid crystal large.

Since the ferroelectric liquid crystal has a high orderliness and a layer structure, once the liquid crystal is oriented, the orientation thereof is not disordered as far as the layer structure is not destroyed. Therefore, it is not limited to the orientation using the rubbing method, and even in the orienting method using no orientation film, that is, performing only an initial orientation, such as a shearing method, a magnetic orienting method, a temperature gradation method or the like, the liquid-crystal molecules are sufficiently oriented, thereby to enable switching operation. However, these methods are used experimentally, however, because they require much time for orienting the liquid-crystal material and are improper for manufacturing of a large-area device so as to be not practical, they are not much used industrially.

Also, as another method, there is a rhombic vapor deposition method in which Sio or the like is obliquely vapor-deposited with respect to the surface of the substrate, however, there is a problem in productivity. Further, when the rhombic vapor deposition method is applied to the large-area substrate, there arises such a problem that differences in vapor-deposition angle, vapor-deposition orientation or the like between the respective points on the substrate cannot be ignored. Therefore, in the current ferroelectric liquid-crystal electro-optical device, the rubbing method is used as the orienting method which is widely industrially used.

Further, because the ferroelectric liquid crystal or the ferroelectric liquid crystal can be switched at a higher speed by about three digits in comparison with the nematic liquid crystal, an on-state and an off-state are controlled every display frame to perform gradation display in accordance with a display time, that is, to enable so-called frame gradation display. A digital gradation display with multi-gradations can be performed by controlling the on/off period in the form of a digital value by using TFTs. The details are disclosed in Japanese Patent Unexamined Publication No. 6-102486 published Apr. 15, 1994 by Konuma et al.

In this case, an amorphous silicon TFT may be used for the TFT. However, for the purpose of allowing the TFT to cope with the high-speed switching operation of the ferroelectric liquid crystal and of obtaining a higher speed, a multi-gradation and a high contrast ratio in the digital gradation display, injection of charges into a pixel is necessary to perform more smoothly. For this reason, there is used a crystalline silicon TFT which is operated at higher speed than the amorphous silicone TFT by about four digits and capable of allowing large current necessary for sufficiently inverting spontaneous polarization to flow.

When an optically uniaxial orientation means is provided on a surface of substrates between which ferroelectric or antiferroelectric liquid-crystal material is interposed between the substrates with the orientation means being in direct contact with the liquid crystal, there has arisen a problem on the switching operation of the liquid-crystal molecules.

For example, in the case of using a rubbing method, in a process where the liquid-crystal material is gradually cooled after it has been injected into the cell, although the rubbing direction and the orienting vector have been arranged in parallel with each other in the SmA phase, the liquid-crystal molecules provide an inclined tilt angle with respect to a normal of the smectic layers when the SmA phase is transit to the SmC* phase. Therefore, the orienting vector of the liquid-crystal molecules is not arranged in parallel with the rubbing direction, as a result of which a bistable stable can be obtained. However, since the above-mentioned rubbing direction exists in an intermediate position between the two stable states of the liquid-crystal molecules, the liquid-crystal molecules are affected by the optically uniaxial orientation controlling force during the switching operation, thereby to obstruct the switching operation of the liquid-crystal molecules.

On the other hand, although the orienting method using a physical means such as the above-mentioned shearing method, the magnetic orienting method, the temperature gradation method is not so practical for mass production, because what produces the optically uniaxial orientation regulating force does not exist after the liquid-crystal material is oriented, the switching operation is not obstructed so that an excellent switching characteristic is obtained.

Therefore, in the ferroelectric liquid-crystal electro-optical device where an optically uniaxial orientation means is formed on a surface which is brought in contact with the liquid-crystal material to orient the liquid-crystal molecules, there have arisen such problems that the switching speed is lowered, the switching operation is insufficiently performed or the like, in comparison with the liquid-crystal electro-optical device where the liquid-crystal molecules are oriented by the shearing method, the magnetic orienting method, the temperature gradation method or the like.

Further, in the liquid-crystal electro-optical device using the ferroelectric liquid crystal or the antiferroelectric liquid crystal, more particularly, in the so-called surface stabilizing ferroelectric liquid crystal (SSFLC) having a substrate gap of several μm and a structure for restraining the spiral structure of the liquid-crystal molecules, because it has the bistable property, the obtained light transmission state has only two bright and dark states, as a result of which the halftone obtained by using the nematic liquid crystal could not been obtained. That is, the amount of the transmitted light could not be continuously changed in accordance with the state change of the liquid-crystal molecules.

In the case where the polarity of an electric field is inverted to switch between a first state and a second state, the SSFLC device performs the switching operation between the above-mentioned two states if the liquid crystal is driven by the strength of the electric field more than a saturation voltage. However, when the strength of the electric field is gradually changed, switching is not performed by uniformly changing the amount of the transmitted light of the entire liquid-crystal material in a region to which the electric field is applied, but the following switching is usually performed. For example, when switching is made from the first state to the second state, a region where the first state is inverted into the second orienting state (hereinafter referred to as "domain") occurs in a region where the first state is exhibited. Under the condition, when the strength of the electric field is further increased, an area of the domain is enlarged thereby to move to the second state.

One of methods of obtaining a halftone in the liquid-crystal electro-optical device using the ferroelectric liquid crystal or the antiferroelectric liquid crystal, using the above-mentioned property, is the area gradation method.

Observing a process of inverting the liquid-crystal molecules of the ferroelectric liquid crystal or the antiferroelectric liquid crystal with a polarization microscope, voltage is applied so that the dark-state region occurs in the bright-state region or the bright-state region (hereinafter referred to as "domain") occurs in the dark-state region in a specified region to which voltage is applied. Further, when voltage is kept applied, the area of each domain is widened in such a manner that the bright state comes to the dark state or the dark state comes to the bright state as the whole specified region.

The area gradation method is to control the area of the bright or dark domain within one pixel by controlling applied voltage, using the fact that the dimensions of the domain are slightly changed with the change of the applied voltage, thereby to obtain a halftone.

Further, in the surface stabilizing type liquid-crystal electro-optical device using the ferroelectric liquid crystal or the antiferroelectric liquid crystal, there is a pixel dividing method as another method of obtaining a halftone. This method is to constitute one pixel by a plurality of small pixels so as to obtain a halftone by combination of two bright and dark states of the respective small pixels.

For example, when one pixel is constituted by four small pixels, the darkest or brightest state makes all of the four small pixels in the dark or bright state. Also, when a halftone is to be obtained, for example, one of four small pixels is kept in the dark state whereas three remaining pixels are kept in the bright state, whereby a halftone having the transmitted light amount of 75% is obtained as one pixel in comparison with the brightest state.

Thus, when a halftone is to be obtained in the liquid-crystal electro-optical device using the ferroelectric liquid-crystal or the antiferroelectric liquid crystal, it must rely on the above-mentioned area gradation method which controls the dimensions of the domain, the pixel dividing method which falsely represents one pixel by a plurality of small pixels, or the like.

However, in the area gradation method, because the inversion of the ferroelectric or antiferroelectric liquid crystal is rapid, in particular, the domain is largely expanded even though an applied voltage value is slightly changed, the width of voltage capable of realizing the area gradation is remarkably narrowed and it has a hysteresis. For this reason, it is difficult to control the domain area by the applied voltage of several mV unit. Also, when the applied voltage is lowered, a response speed is remarkably low, as a result of which uniform display is not enabled. Furthermore, it is difficult to elevate the resolution of display, and therefore this method has not been practical.

Further, in the pixel dividing method, the efficiency is low because a plurality of pixels are used for one pixel, and also there is technically a limit to increase the number of pixels by reducing the area of one pixel. Also, it is improper to make the resolution high.

Still further, in the conventional surface stabilizing type liquid crystal electro-optical device using a ferroelectric liquid crystal or an antiferroelectric liquid crystal, a low-voltage drive could not be expected because it has a high threshold value.

Further, in the conventional surface stabilizing type liquid crystal electro-optical device, the orienting process subjected to a pair of substrates is different between both the substrates so that the orienting stability of the liquid-crystal material is kept monostable, and the strength of the electric field is changed, as a result of which gradation display is performed. However, even in this method, consequently the inversion with the domain is made at the switching operation, and the same difficulty as the above-mentioned bistable type follows. Therefore, it is not sufficient as the gradation display.

Therefore, in the liquid-crystal electro-optical device using the ferroelectric or antiferroelectric liquid-crystal material, it has been desired to provide a structure which can perform an excellent halftone gradation display.

Further, when the frame gradation method is used in the active matrix type antiferroelectric liquid-crystal electro-optical device, in order to perform high-speed and high-contrast display, it is required that the inversion of the liquid-crystal molecules of the ferroelectric liquid crystal at the time of applying a signal is conducted in an extreme short time, the inversion is sufficient, and the state of the liquid-crystal molecules after conversion is kept constant without any changes. The state of the liquid-crystal molecules is mainly determined in accordance with the strength of voltage applied to the electrodes of both the substrates.

By the way, there has been well known that an impurity having charges transferred from the liquid crystal or the orientation film exists in the device, and there occur surplus charges which allow voltage to be generated in a direction reverse to applied voltage when applying voltage. These charges freely move within the liquid-crystal material which is held between both the substrates with application of voltage. A lot of these charges move to reach the surface of the orientation film, and because the orientation film is naturally insulative, the charges then move no more in such a manner that they are accommodated on a liquid-crystal interface of the orientation film between the orientation film and the liquid-crystal layer (a layer of the liquid-crystal material).

These charges cause a problem which is of disadvantage to the liquid-crystal electro-optical device. For example, action which cancels voltage applied between the electrodes is produced, resulting in decrease of contrast. For example, when pulsed voltage is applied by driving the TFT, there occurs such a two-steps response that the transmission or non-transmission switching is not rapid in such a manner that, after the transmission or the non-transmission is switched once, it is further switched with a small delay, or attenuation is generated immediately after switching operation. In order to solve this problem, it is required that applied voltage is made larger than voltage necessary for inverting the spontaneous polarization. However, this is not a satisfactory countermeasure.

When voltage is applied between the electrodes, the state of the liquid-crystal molecules is not stabilized because the charge amount within the liquid-crystal layer is changed as a time elapsed. Further, the liquid-crystal molecules which have been electrically attracted by the charges stored in an interface between the orientation film and the liquid-crystal has larger voltage required for change of the state than the liquid-crystal molecules within the liquid-crystal layer, which are not attracted. Therefore, the liquid-crystal molecules within the liquid-crystal layer are not changed in state together, but, the light transmission characteristic which is most important as the characteristics of the liquid-crystal electro-optical device is not stabilized.

Then, as the liquid-crystal electro-optical device, the display is unstable, the display speed is unavoidably lowered without making use of the high speed capability of the liquid crystal material, and the contrast is lowered. In particular, when performing frame gradation display, the number of gradations is limited.

In order to solve this problem, there is an attempt in which the orientation film material relaxing the storage of charges is selected, or a method in which SiO or the like is obliquely vapor-deposited on the electrodes instead of using the orientation film of an insulating film. However, in such methods, it takes time to conduct a large number of preliminary experiments, which causes the costs to rise, and also its effect is changed in accordance with combination of the materials used. Therefore, such methods are not general. Also, there is a method of removing an impurity by purifying the liquid-crystal. However, in this method, the purified liquid crystal which is usable is very slight so that it is very improper to mass-productivity. Further, there is a method in which charges existing within the liquid-crystal layer is absorbed or coupled by using charge transfer complex or the like in such a manner that positive or negative charges are canceled or neutralized. However, it is difficult to measure and insert the charge transfer complexes by the amount necessary for completely canceling charges within the device, as a result of which surplus charge transfer complexes move within the liquid-crystal layer, likewise as the above-mentioned charges.

As mentioned above, there have been proposed various methods for canceling a factor which causes change of voltage applied to the liquid-crystal layer, that is, charges existing within the liquid-crystal layer, which is a factor for changing the liquid-crystal molecules as a time elapsed to un-stabilize the optical characteristics of the device, however, it is difficult to readily and completely cancel such a factor.

SUMMARY OF THE INVENTION

Therefore, an object of the present invention is to provide a liquid-crystal electro-optical device and a method of manufacturing the same, which are capable of eliminating the inhibition of the switching of liquid-crystal molecules, which results from the fact that a direction of an optically uniaxial orientation regulating force and directions of two stabilizing states exhibited by the liquid-crystal molecules are different from each other in the SmC* phase, which is a problem in a method of forming an optically uniaxial orientation means on the surfaces of substrates between which a ferroelectric liquid-crystal material is held, in particular, when the rubbing method is used for the ferroelectric liquid crystal, so that the uniaxial orientation regulating force does not obstruct switching operation of the liquid-crystal molecules.

Another object of the invention is to provide a structure in which the regulating force for uniaxially orienting the liquid-crystal material is exerted only when the liquid-crystal material is initially oriented during a process where a liquid crystal is injected between the substrates and thereafter the liquid-crystal material is gradually cooled, and after the liquid-crystal material is uniaxially oriented, what generates the uniaxial orientation regulating force does not exists.

That is, the object of the invention is to realize a ferroelectric liquid-crystal electro-optical device excellent in switching characteristics and industrially superior in productivity by substantially reducing or eliminating the orientation regulating force of the uniaxial orientation means.

Still another object of the invention is to provide a liquid-crystal electro-optical device using ferroelectric or antiferroelectric liquid-crystal material in which a spiral structure exhibited by the liquid-crystal material in a bulk state is restrained, to perform optical switching without occurrence of a domain, and a method of manufacturing the same.

Yet still another object of the invention is to provide a liquid-crystal electro-optical device capable of readily realizing a change in continuous gradation and a halftone in accordance with a change in applied voltage, by using ferroelectric liquid crystal or antiferroelectric liquid crystal which can make an area of the device large and a processing speed of the device high, as in nematic liquid crystal, and also a method of manufacturing the same.

Yet still another object of the invention is to provide a liquid-crystal electro-optical device of an active matrix type using ferroelectric liquid crystal having a crystalline silicon TFT with high performance, which is capable of performing high-speed multi-gradation display and has high contrast ratio, in which an adverse effect caused by undesired charges within a liquid-crystal layer is removed to realize an increase in a processing speed of the device and stabilization of an optical characteristic.

In order to solve the above-mentioned various problems, a first aspect of the present invention has been achieved by provision of a liquid-crystal electro-optical device in which a ferroelectric or antiferroelectric liquid-crystal material is held between a pair of substrates, an orientation controlling force (an uniaxial orientation means), which allows said ferroelectric or antiferroelectric liquid-crystal material to be optically uniaxially oriented, is exerted on at least one of inner surfaces of said pair of substrates, and means for restraining said orientation controlling force is provided on the surface on which said orientation controlling force is exerted. That is, the invention is characterized in that there is provided a means for at least partially isolating the optically uniaxial orientation means from the liquid-crystal material.

In the present invention, in order to obtain the above-mentioned structure, resin is provided between the uniaxial orientation means and the liquid crystal layer. That is, said uniaxial orientation means allows said liquid-crystal material to be oriented at least its initial orienting stage, and said resin functions as a means for reducing an adverse effect of the uniaxial orientation means on the liquid crystal at the switching operation of the device.

Also, in the present invention, said resin may be in the form of a film or in the form of a large number of grains (or convex-shape). Therefore, there are a case where the entire surface of the liquid-crystal layer is covered with the resin, and a case where only a part of the liquid-crystal layer is discontinuously covered with the resin.

Further, it is not always necessary that said resin is interposed only between the uniaxial orientation means and the liquid-crystal material, that is, said resin may exist on an interface between the liquid-crystal material and a surface brought in contact with the liquid-crystal material. The surface brought in contact with the liquid-crystal material may be, for example, an electrode surface, an insulator such as a silicon oxide other than the uniaxial orientation means.

Also, the resin used in the present invention is made of insulating material.

Further, the uniaxial orientation means includes an orientation film which has been subjected to a rubbing process.

Further, the above-mentioned liquid-crystal electro-optical device in accordance with the present invention is characterized in that one of a pair of substrates is provided with a switching element connected to a pixel electrode to perform active matrix type drive.

Still further, another aspect of the present invention has been achieved by provision of a method of manufacturing the above-mentioned liquid-crystal electro-optical device. That is, there is provided a method of manufacturing a liquid-crystal electro-optical device comprising the steps of: holding a mixture into which a ferroelectric or antiferroelectric liquid-crystal material is mixed with uncured resin between a pair of electrodes having electrodes on both of inner surfaces thereof and an optically uniaxial orientation means on one or both of the inner surfaces thereof; uniaxially orienting said liquid-crystal material in accordance with an orientation controlling force of said orientation means; and subsequently curing said uncured resin to provide cured resin between the liquid-crystal material and a surface brought in contact with the liquid-crystal material.

Further, in the method of manufacturing the above-mentioned liquid-crystal electro-optical device, the invention is characterized in that the uncured resin comprises ultraviolet curable resin.

Further, still another aspect of the present invention has been achieved by provision of a method of manufacturing a liquid-crystal electro-optical device in which a mixture into which a ferroelectric or antiferroelectric liquid-crystal material is held between a pair of substrates having electrodes on both of inner surfaces thereof and an optically uniaxial orientation means on one or both of the inner surfaces thereof; means for restraining an orientation controlling force of said optically uniaxial orientation means is provided on said optically uniaxial orientation means; and said liquid-crystal material is oriented in accordance with the orientation controlling force of said optically uniaxial orientation means, the method comprising the steps of: allowing the temperature of said liquid-crystal material to rise from the room temperature to the temperature at which said liquid-crystal material exhibits the SmA phase or the N* phase; and after that the temperature is maintained for a given time, cooling said liquid-crystal material to the temperature of the SmC* phase.

The present invention will be described with reference to FIG. 1. Shown in FIG. 1 is a conceptual diagram showing a simple matrix type liquid-crystal electro-optical device in accordance with the above-mentioned invention. In FIG. 1, reference numerals 1 and 2 denote transparent substrates; 3 and 4, pixel electrodes; 5, an orientation film which is subjected to a rubbing process and constitutes an optically uniaxial orientation means for arranging liquid crystal or the like in a given direction after injecting the liquid crystal; and 7, ferroelectric liquid-crystal material. The liquid-crystal material 7 is uniaxially oriented in accordance with the orientation film 5. Resin films 6 which constitute means for restraining an orientation controlling force of the orientation film is formed between the orientation films 5 and the liquid-crystal material 7. Polarizing plates 9 and 10 are provided on the outer surfaces of the transparent substrates 1 and 2.

In manufacturing the liquid-crystal electro-optical device, after the liquid-crystal material held between a pair of transparent substrates 1 and 2 each having the electrode 3 or 4 and the orientation film 5 as the uniaxial orientation means with a substrate interval determined by a spacer 8 is oriented in accordance with the orientation film 5, a resin film which restrains the orientation controlling force may be formed on the orientation film.

In more detail, a mixture into which liquid-crystal material is mixed with uncured resin to which a reaction initiating agent is added is heated until it comes to the isotropic phase and injected between a pair of transparent substrates having the electrodes and the orientation films, and thereafter gradually cooled, as a result of which the liquid-crystal material is uniaxially oriented by the orientation films. Thereafter, the uncured resin is coated on the oriented means and cured by means for curing the uncured resin mixed into the liquid-crystal material.

At this time, because the resin is cured after the liquid-crystal material is arranged in accordance with the orientation means, the resin can be cured on the orientation film in the form of a film while a preferable orienting state before curing is maintained. The resin which has been cured does not adversely influence the orientation of the liquid-crystal material.

With the above-mentioned aspect of the invention, switching operation can be performed at high speed, orientation defects can be prevented, and undesired charges can be removed.

In the above-mentioned aspect of the invention, the orientation film is obtained by forming a film made of organic polymeric resin such as polyimide or the like on the substrates and the electrodes and then subjecting the film to a rubbing process, likewise as the conventional orientation film. The rubbing process may also be the same as the conventional one.

As other cases, if the orientation film is an orientation means for uniaxially orienting the liquid-crystal material by the surface characteristic of a surface brought in contact with the liquid-crystal material, the invention is applicable thereto. A case where the substrate or the electrode surface is directly subjected to rubbing or the like so as to provide an uniaxially orienting force can be applied in the same way. The rhombic vapor deposition film can be also practiced.

Also, as the resin film 6 for restraining the orientation controlling force, there can be used a polymeric resin or the like.

It is desirable that material of the resin film 6 as means for restraining the orientation restraining force in the present invention exhibits a mixed state of the resin film material with the liquid-crystal material at a high-temperature, and is separated from the liquid-crystal material in a state where the temperature is lowered. Also, because of curing resin in a state where the resin is held between two substrates, it is remarkably desirable to contain no solvent in uncured resin. Further, because the separation of liquid-crystal material from resin and formation of liquid-crystal material in an oriented state greatly depend on the temperature, it is desirable to cure resin by a factor different from the temperature. Taking such matters into consideration, it is preferable to use an ultraviolet curable resin as an uncured resin and ultraviolet radiation as curing means.

Further, the density of resin material in a mixture of resin material and liquid-crystal material is arbitrary, however, it is proper to set the density to 20% or less.

In the liquid-crystal electro-optical device shown in FIG. 1 in accordance with the invention, the liquid-crystal material 7 is not in contact with the orientation film 5 due to the resin film 6 formed on the surface of the orientation film so as to be isolated therefrom. Therefore, the orientation controlling force of the orientation film on the liquid-crystal material is restrained.

Alternatively, even though the liquid-crystal material 7 and the orientation film 5 are partially in contact with each other because the resin film 6 is thin, the orientation controlling force is substantially restrained by existence of the resin film 6. Thus, in the present invention, while the liquid-crystal material is oriented by the orientation film constituting the uniaxial orientation means, the orientation controlling force of the orientation film after then is substantially lowered or becomes null. Therefore, the orientation controlling force of the orientation film can be prevented from obstructing the switching operation of liquid-crystal molecules.

Further, by making the density of resin material added in liquid-crystal material high or by controlling the kind of the orientation film or the curing method or the like in order to form the resin film 6, there is a case where the resin (21) is formed in a column-shape between two substrates. However, because the column-shaped resin is formed after the liquid-crystal material is oriented, there is almost no influence of the liquid-crystal material on orientation. The column-shaped resin can prevent the destroy of the layer structure in such a manner that a substrate interval is prevented from expanding so as to be kept constant in the case where an area of the display unit is enlarged or the like.

Further, in the above-mentioned liquid-crystal electro-optical device in accordance with the invention, occurrence of orientation defects is reduced in comparison with the conventional liquid-crystal electro-optical device without a resin film. As a result, the contrast ratio as the device can be improved.

Still further, when the resin material used for the resin film 6 has a high insulating property, because it becomes to be an insulating film, it has a function of a short-circuit preventing film for preventing the short-circuit between the upper and lower electrodes.

Also, in the liquid-crystal electro-optical device using the usual ferroelectric liquid crystal, when the failure of orientation occurs, such failure is repaired by a method in which, after the liquid-crystal material is heated to the temperature at which it comes to the Iso (isotropic) phase, it is cooled to the liquid-crystal phase. However, in the present invention, because the device which has been completed once is reduced in orientation controlling force of the uniaxial orientation means due to the resin film, the oriented state is not sufficiently repaired even if this method is used.

However, in the device of the invention, it is ascertained that the liquid-crystal material is not in the Iso phase, but is heated until it becomes in the SmA* phase or the N* phase, and then its temperature is kept for a given time, as a result of which the orientation state is repaired. Therefore, in the device of the invention, even though the failure of the oriented state occurs, it can be repaired.

That is, the above-mentioned liquid-crystal electro-optical device is heated to the temperature indicated below in accordance with the kind of the liquid-crystal material, then held at that temperature for a given time, and thereafter gradually cooled.

First, as the temperature, (1) In the case of liquid-crystal material having Iso-N*-SmA-SmC*-Cry phase system, the temperature exhibiting the N* phase or the SmA phase is set.

(2) In the case of liquid-crystal material having Iso-SmA-SmC*-Cry phase system, the temperature exhibiting the SmA phase is set.

Subsequently, it is desirable to hold the above-mentioned device to the above temperature for several minutes or more, preferably for 10 to 60 minutes.

With the above-mentioned method, after a mixture of liquid-crystal material and resin material is injected and gradually cooled, the orienting property of the device in a state where resin is cured in accordance with the invention can be improved, and even in the device where the failure of orientation has occurred, a preferable orienting property can be obtained, thereby to improve the contrast ratio.

Further, when the resin film 6 is formed in accordance with the invention, the undesired charges caused by impurities or the like contained in the liquid-crystal material substantially disappear by the cleavage of the reaction initiating agent and curing of resin material. Accordingly, if voltage is applied between electrodes, current flows only when the spontaneous polarization of the liquid-crystal material is inverted, in such a manner that undesired current does not flow when it is not inverted. As a result, more stable and higher-speed switching operation can be realized.

The above-mentioned structure of the invention is effective in the simple matrix type liquid-crystal electro-optical device, and also effective in the active matrix type liquid-crystal electro-optical device.

With the above-mentioned structure of the invention, after the liquid-crystal material is oriented, the optically uniaxial orientation controlling force on the liquid-crystal material is not exerted or lowered, thereby to prevent the switching operation of the liquid-crystal molecules from being obstructed. As a result, the switching operation can be made at high speed. Also, the defect of orientation can be reduced, and occurrence of short-circuit between the electrodes can be prevented.

Also, even in a state where the uniaxially orienting property is restrained, the orienting property of the liquid-crystal material can be improved and a defect of orientation can be repaired.

Further, in the above-mentioned liquid-crystal device, the present invention is characterized in that the switching operation of the above-mentioned liquid material caused by an electric field applied to the above-mentioned electrodes is performed without occurrence of a domain.

Still further, in the above-mentioned liquid-crystal device, the present invention is characterized in that the spiral structure of the ferroelectric liquid crystal or the antiferroelectric liquid crystal is loosened when no electric field is applied, and the direction of the orienting vector of the liquid-crystal molecules is continuously changed in accordance with the magnitude of an electric field applied.

Still further, particularly an active matrix driving is appropriate for the liquid-crystal device of the present invention. This is because, in the case of the simple matrix type, voltage applied to liquid crystal cannot be maintained for a sufficient time because the bistability of the liquid-crystal molecules is weakened by the resin, as a result of which display quality cannot be elevated.

Further, in the present invention, in order to restrain the formation of a domain at the time of the switching operation of liquid crystal, the proportion of monomers contained in the uncured resin is heightened. That is, the proportion of the monomer is set not lower than 60 weight % although it depends upon a molecular weight of the monomer or other conditions.

A case where the present invention is used in the active matrix type display device will be described with reference to FIG. 2. In FIG. 2, reference numerals 11 and 12 denote transparent substrates; 13 is an opposed electrode; 14 is a pixel electrode; 15 is a thin-film transistor (TFT) as a switching element; 16 is a uniaxial orientation means for arranging liquid-crystal material such as an orientation film or the like in a given direction; 17 is a resin film; 18 is a ferroelectric liquid-crystal material. The liquid crystal material 18 is uniaxially oriented in accordance with the orientation means 16. Polarizing plates 19 and 20 are provided on the outer surfaces of the transparent substrates 11 and 12.

The uniaxially orienting processing method used in the above-mentioned structure can use an orientation film made of an organic high polymer or the like, which has been subjected to a rubbing process, likewise as in the conventional method. Also, in the rubbing condition, likewise as in the conventional condition, the orientation film is rubbed in one direction with a roller on which cloth is wound. The orientation film may be formed on both of the substrates or on only one substrate. As other uniaxially orienting method, there can be used various orienting methods such as the magnetic field orienting method, the shearing method, the temperature gradation method and the rhombic vapor deposition method.

In manufacturing this liquid-crystal electro-optical device, the cell gap is determined in accordance with spacers (not shown in the figure), a mixture of liquid-crystal material and uncured resin to which a reaction initiating agent is added is interposed between a pair of transparent substrates 11 and 12 having the electrodes 13 and 14, and then the liquid-crystal material is uniaxially oriented. Thereafter, the uncured resin is separated between the liquid crystal and the surface of the orientation means or the electrodes, and cured by means for curing the uncured resin mixed into the liquid-crystal material, thereby to form the resin film 17.

At this time, because the resin is cured after the liquid-crystal material is arranged in accordance with the orientation means, the resin can be cured on the orientation film in the form of a film while a preferable orienting state of the liquid crystal before curing is maintained. The resin which has been cured does not adversely influence the orientation of the liquid-crystal material.

The inventors has found that, after uncured resin is mixed into liquid-crystal material and injected between the substrates, the uncured resin is cured, as a result of which action of undesired charges existing in the liquid crystal layer which make the state of liquid crystal unstable can be removed.

As this action, it is considered that the above-mentioned undesired charges are taken in by the resin when the resin material is cured, or a reaction initiating agent generally mixed into the uncured resin is diffused in the liquid-crystal material and cleaved when the resin is cured to produce charges, whereby the undesired charges are absorbed by the charges thus produced or coupled therewith.

According to the invention, the movement of charges and storage of charges on an interface between the orientation film and the liquid-crystal are eliminated. Therefore, when voltage is applied between the electrodes, spontaneous polarization can be rapidly and sufficiently inverted. Further, a change in a display state after inversion switching as a time elapsed can be removed. Furthermore, because no liquid-crystal molecules to be absorbed on the substrates exist, a state of the whole liquid-crystal layer between the electrodes is changed uniformly when voltage is applied thereto, to thereby achieve a more stable optical characteristic. Consequently, display having a high contrast ratio at high speed can be realized.

Naturally, the optically uniaxially oriented ferroelectric liquid crystal exhibits a property that the liquid-crystal molecules exist at any positions on a side surface of a cone having an axis which is normal to the smectic layer at the same probability, while the liquid crystal molecules are inclined with a given angle with respect to a normal of the layer in the SmC* phase, and the directions of orienting vectors of the liquid-crystal molecules are free. This state is called "gold stone mode". It is considered that the above-mentioned surface stabilizing device performs the switching operation in which the direction of the orienting vector of the molecules is limited to specified two directions in the gold stone mode.

It has been considered that if the switching operation which is free of this limitation can be realized, when an electric field is applied to liquid-crystal material so as to be continuously changed, all of the liquid-crystal material in a region where the electric field is applied is not accompanied by occurrence of domains so that the switching operation in which the transmitted light amount is uniformly continuously changed in accordance with the strength of the electric field.

In particular, since a method of performing gradation display in accordance with the strength of an electric field is already conducted in the TN- and STN-type liquid-crystal electro-optical device, there is an advantage that this technique can be applied as it is.

With the structure of the invention, there is obtained the switching operation in which the transmitted light amount is uniformly continuously changed in accordance with the strength of the electric field in such a manner that the liquid-crystal material in the whole region where the electric field is applied is not accompanied by occurrence of domains. In manufacturing, the substantially same processes as those of the conventional surface stabilizing device are used to perform high productivity.

It is considered that the liquid-crystal electro-optical device of the invention stands in a state where the orienting vector of the liquid crystal molecules can be freely taken, which is different from the conventional surface stabilized type device. As in a liquid crystal electro-optical device in which a spiral structure of a ferroelectric liquid crystal is eliminated due to the narrow cell gap, it becomes possible to switch the liquid crystals uniformly without forming domains and to exhibits gradational display in accordance with a magnitude of an applied electric field. Therefore, the gradation display can be performed by the strength of an electric field at a remarkable high speed.

In the present invention, it is considered that the resin film has a function of relaxing an anchoring effect of the orientation film or the electrodes to the liquid crystal.

Further, the response of the liquid-crystal molecules is improved, and in the case of driving the liquid-crystal material, the inversion of liquid crystal molecules between brightness and darkness is in one step, whereas, in the conventional bistable type, such an inversion state is in two steps because of the formation of domains. Thus, the rapidity of a response is significantly improved.

Furthermore, in the above-mentioned structure of the invention, a threshold value when switching is lowered in comparison with the conventional bistable device. For this reason, a low-voltage drive can be performed in comparison with the conventional bistable device.

In the above-mentioned device of the invention, apart from a case where a transmitted light amount is uniformly changed over the entire pixel portions, there is a case where there occurs a state in which a domain occurrence (inversion) mixedly exists in a minute region while the transmitted light amount is uniformly changed, depending upon a manufacturing condition such as liquid crystal or resin material to be used or a resin curing condition. Even in such a case, the switching operation can be continuously performed in accordance with the magnitude of applied voltage.

There is a case where the above-mentioned resin is formed in the form of column between two substrates when the density of resin material added into liquid-crystal material is heightened. This is a useful method in the case where the substrate interval is necessarily kept constant, such as a case where the area of a display unit is enlarged.

Furthermore, after the resin is cured, the liquid-crystal material is heated to the temperature at which the material exhibits the N* phase or the SmA phase, and then at that temperature, it is maintained constant for 10 minutes or more, preferably for 10 to 30 minutes. Thereafter, the liquid-crystal material is gradually cooled again. With this method, the orienting state of the liquid-crystal material can be improved.

Also, viewing a display portion of the device after the resin is separated and deposited from a substrate surface, if the ratio of an area occupied by the resin cured in the form of a column is 0.1 to 20%, satisfactory performance as a liquid-crystal electro-optical device can be obtained.

Further, the function for removing the action of undesired charges was also obtained by cleaving a reaction initiating agent by ultraviolet radiation or the like after only the reaction initiating agent which is usually added to resin on the market is mixed into liquid-crystal material. Also, the amount of a reaction initiating agent to be added to the resin may be changed, or resin may be previously divided into resin material (monomers or oligomer) and a reaction initiating agent so that they are individually mixed with each other.

Further, according to the present invention, transmission and non-transmission of each pixel are controlled in accordance with a plurality of frames, whereby gradation display can be performed. That is, in the above-mentioned electro-optical device, one frame is divided into N (N is the natural number having numeral of 2 or more) sub-frames having duration different from each other, and if the shortest duration of the sub-frame is $T_0$, a displaying method that the duration of those sub-frames is any one of $T_0, 2T_0, 2^2T_0, \ldots, 2^N T_0$ is enabled.

In the structure of the present invention, although the liquid-crystal material has no bistability, the bistability of the liquid-crystal material per se is not necessary because it performs the active matrix type drive. Also, because of this, gradation display is enabled in accordance with the strength of an electric field. Therefore, according to the present invention, the gradation display at high speed and with high contrast can be realized with a halftone produced by a frame gradation and a halftone produced by an electric field due to domainless switching operation together. These halftones may be used independently from each other, or both may be combined with each other to thereby obtain a liquid-crystal electro-optical device at very high speed, with multi-gradation display and with high quality.

In the liquid-crystal device described in connection with FIGS. 1 and 2, the resin brought in contact with the liquid crystal is film-shaped, however, as described above, it is not always necessary that the resin is in a continuous-film-shape. That is, there is a case where a large number of minute resins which are grain-shaped or convex-shaped are brought in contact with the liquid crystal so as to be deposited. An example of the liquid-crystal device having such a structure will be described with reference to FIG. 3. In this case, an example of the simple matrix type liquid-crystal electro-optical device is shown, however, the active matrix type device using TFTs or the like is also usable, as described above.

On transparent substrates 1 and 2 having electrodes 22 and 23, orientation means 24 and 25 for optically uniaxially orienting liquid-crystal molecules are formed on at least one surface of these substrates.

A substrate interval is uniformly controlled by a spacer 28. The substrate interval is narrow sufficient to suppress the spiral structure of the liquid-crystal molecules. Also, these substrates 1 and 2 are fixed with a sealing agent 29. Liquid-crystal material 26 is held between the substrates. The liquid-crystal material 26 is optically uniaxially oriented in accordance with the orientation means 24 and 25.

On the other hand, a plurality of minute grains 27 in contact with the surface of the liquid-crystal material are mainly formed on the orientation means 24 and 25. The grains 27 are made of resin. Polarizing plates 30 and 31 are disposed on the outer surfaces of the transparent substrates 1 and 2.

When the orientation means are formed only on the side of any one of the substrates, protrusions 27 are formed, for example, on the orientation means 24 and the transparent substrate 1 or electrodes 23 on the substrate 1. Also, when an insulating film, a ferroelectric thin film or the like is formed on one or both of the substrates so as to be in contact with the liquid-crystal material 26, the protrusions 27 are formed on those films.

As the optically uniaxially orienting method, apart from the rubbing method using the orientation film, various methods such as the magnetic field orienting method, the shearing method, the temperature gradation method, and the rhombic vapor deposition method can be used.

In manufacturing the above-mentioned liquid-crystal electro-optical device, uncured resin is mixed with ferroelectric liquid crystal or antiferroelectric liquid crystal, heated until it becomes in the isotropic phase and more mixed. This mixture is then injected in between the substrates and cooled until the liquid crystal re-exhibits the SmC* phase (usually the room temperature). In this process, the liquid crystal is oriented in accordance with an orientation controlling force of the uniaxial orientation means, and an excellent extinction position can be ascertained under a polarization microscope. The resin is separated and deposited in such a manner that it is expelled from the mixture to between the liquid-crystal molecules or between the layers (between smectic layers). After the resin is nearly completely separated from the liquid crystal, it is cured and rendered insoluble to the liquid crystal. Since these resins are expelled, separated and deposited as the liquid crystal is oriented, no orientation of the liquid crystal is disturbed.

The substrate after the resin is cured was observed by an SEM (scanning type electronic microscope) after the liquid-crystal material is evaporated. As a result, a plurality of minute protrusions constituted by resin having a height of about 10 nm and a diameter of 500 nm or less, typically several tens to several hundreds nm can be ascertained. The protrusions exist so as to be uniformly dispersed all over the surface, and there is also portions where a plurality of protrusions are partially linked together.

In this way, on a surface brought in contact with the liquid-crystal surface, that is, on the surface of the substrate, the transparent substrate, the orientation film, the insulating film and the like, a plurality of minute resins can be disposed in the form of a grain.

Then, the switching operation, which makes the transmitted light amount continuously change without occurrence of domains by controlling applied voltage, is enabled, thereby being capable of obtaining a halftone. Further, within a region to which the same voltage is applied, for example, in one pixel, the nearly same gradation can be obtained. As a result of observing the switching state by a polarization microscope, the existence of domains is not ascertained at least visually.

Also, in order to constitute resin into minute grains, it is preferable to use resin which has low viscosity and liable to be along the orientation of liquid crystal, and it is preferable to contain a large amount of low molecule resin (hereinafter referred to as "monomer") although it depends on the molecule weight.

Usually, resin consists of monomers, oligomer (high polymeric resin) and a reaction initiating agent. This resin is mixed into the liquid crystal material at about 1 to 20%, preferably about 1 to 10%.

It is desirable that the component of resin material is organized so that the amount of monomers contains 2% by weight or more with respect to a mixture of liquid-crystal material and resin material, and mixed into the liquid-crystal material.

Further, it is desirable that the component of resin material is organized so that the amount of monomers is 40% by weight or more of resin material, preferably, 60 to 90% by weight, and mixed into the liquid-crystal material.

As the amount of monomers is reduced, the number of resin grains formed is decreased so that switching of continuously changing the transmitted light amount without occurrence of a domain and switching of bright and dark states with occurrence of a domain is likely to mixedly exist, or only the latter switching is likely to occur. On the other hand, as the monomer amount is increased, switching of continuously changing the transmitted light amount without occurrence of a domain is conducted, however, optical characteristics such as the contrast ratio tend to be lowered.

Further, the monomer is preferably composed of acrylic.

By thus composing the resin, in the liquid-crystal electro-optical device prepared, on the surfaces of the substrate, the electrode on the substrate, the orientation film or the like, resin can be formed into grains having a height of several tens nm and a diameter of about 500 nm or less, typically several tens to several hundreds nm.

Furthermore, after the resin is cured, the liquid-crystal material is heated to the temperature at which the material exhibits the N* layer or the SmA layer, and at this temperature, the material is maintained constant for ten minutes or more, preferably for ten to thirty minutes. Thereafter, the liquid-crystal material is cooled to the room temperature, as a result of which the orienting state of the liquid-crystal material may be improved.

Also, in the liquid-crystal electro-optical device of the invention, it is extremely effective to provide the structure of the active matrix type driving having switching elements such as thin-film transistors, thin-film diode or the like on the respective pixels.

With the above-mentioned structure, in the liquid-crystal electro-optical device using ferroelectric liquid crystal or antiferroelectric liquid crystal, the transmitted light amount is continuously changed to thereby obtain a halftone. As its reason, apart from the fact that the above-mentioned anchoring force of the orientation film is lowered, the following reasons are considered.

Observing the state of switching operation in the conventional liquid-crystal electro-optical device using a ferroelectric liquid crystal or antiferroelectric liquid crystal through a polarization microscope, it is ascertained that a large number of domains of a dark state appear in a bright state or a large number of domains of a bright state appear in a dark state by gradually increasing a magnitude of an applied voltage, and the respective areas are gradually enlarged (hereinafter, referred to as "grow"). That is, the switching operation of the ferroelectric liquid crystal or the antiferroelectric liquid crystal comes to chain-reactive switching operation in which, with a part of liquid-crystal molecules being inverted as a start, other liquid-crystal molecules existing around the part of liquid-crystal molecules are inverted one after another.

On the other hand, if the resin is formed into a plurality of minute grains on the substrate as in the present invention, they exist between the layers or the adjacent liquid-crystal molecules in such a way that they have a size and a configuration of the degree that the orientation of the liquid-crystal molecules is not disturbed. Thus, it is considered that the chain of the inversion is interrupted by the resin in the form of protrusion, as a result of which further inversion of the peripheral liquid-crystal molecules is not induced.

That is, it is considered that these protrusions on the substrates prevent the adjacent liquid-crystal molecules from being inverted in the chain reactive manner, as a result of which the liquid-crystal molecules or the extreme minute domains do not induce the inversion of the liquid-crystal molecules around the inverted ones, but the respective liquid-crystal molecules are independently inverted.

Therefore, it is expected that, within a specified region, for example, within one-pixel region, extremely minute regions exhibiting a bright state or a dark state appear at a specified rate by a specified applied voltage, and the transmitted light amount is continuously changed by applied voltage without occurrence of the domain to thereby obtain a halftone.

Observing the switching operation of the liquid-crystal electro-optical device in accordance with the present invention under the polarization microscope, it was ascertained that applied voltage value is changed whereby the transmitted light amount is uniformly and continuously changed so that the entire region to which voltage is applied is changed from a bright state to a dark state, or from the dark state to the bright state without occurrence of a domain.

In the above-mentioned liquid-crystal electro-optical device of the present invention, within such a voltage applied region, for example, within one pixel, the transmitted light amount is continuously and uniformly changed with applied voltage value. Therefore, compared with the conventional area gradation method and the pixel dividing method, an area necessary for obtaining the gradation can be remarkably reduced to thereby provide a liquid-crystal electro-optical device with high resolution and multi-gradation.

Further, the above-mentioned liquid-crystal electro-optical device of the present invention is characterized by its switching characteristic.

FIG. 4 shows an optical characteristic in the case where the conventional surface stabilizing liquid-crystal electro-optical device is driven by a square wave of ±1.5 V.

In FIG. 4, the optical characteristic to the applied voltage when switching from a dark state to a bright state or from the bright state to the dark state exhibits two-steps response characteristic. That is, in a switching start point, the optical characteristic is rapidly changed, and thereafter slowly changed to thereby complete the switching operation.

On the other hand, FIG. 5 shows an optical characteristic in the case where the liquid-crystal electro-optical device of the present invention is driven by a square wave of ±1.5 V.

In FIG. 5, the optical characteristic is rapidly changed from a start of switching to a completion thereof throughout the whole region.

Considering the above difference, it is expected that, in the two-step response in the conventional liquid-crystal electro-optical device shown in FIG. 4, an initial rapid change in the optical characteristic exhibits a state in which the liquid-crystal molecules or the minute domains are switched on several portions, whereas a slow change in the optical characteristic in the second step exhibits a state in which the liquid-crystal molecules or the minute domains are switched, according to which their peripheral liquid-crystal molecules are switched in the chain manner so that the domains are enlarged.

On the other hand, in the rapid response in the liquid-crystal electro-optical device of the present invention shown in FIG. 5, it is considered that, because the liquid-crystal molecules and the minute domains are switched in the entire region, the optical characteristic is rapidly changed from the start of switching to a completion thereof.

Further, as is apparent from this, compared with the conventional device, in the liquid-crystal electro-optical device of the present invention, because a high-speed and sufficient switching operation is conducted even at low voltage, drive voltage can be lowered.

Thus, in the liquid-crystal electro-optical device using the ferroelectric liquid-crystal or antiferroelectric liquid-crystal in accordance with the present invention, a continuous gradation change and a halftone due to a change of applied voltage can be readily obtained. Therefore, transmitted light or reflected light is switched at high speed, and the liquid-crystal electro-optical device having multi-gradation and high resolution can be realized. In addition, large-sized device can also be easily obtained. Further, drive voltage can be lowered.

In the present invention, whether the switching operation is followed by occurrence of a domain or uniformly continuously changed depends on the amount of monomers contained in the uncured resin material mixed into the liquid-crystal material.

The uncured resin material consists of low molecular monomers (molecular weight of 1000 or less), high molecular monomers (molecular weight of 1000 or more) and a reaction initiating agent. When the amount of monomers are small, switching accompanied by the occurrence of a domain is made, however, as the amount of monomers is increased, a region where each domain is expanded is reduced while the number of regions where a domain occurs is increased. That is, under this state, there is provided bistability (memory property).

Further, if the amount of monomers is increased, it comes to uniform and continuous switching without occurrence of domains. In this state, the bistability (memory property) is not exhibited.

In particular, if the amount of monomers in the resin material has 40% by weight or more, preferably 60% or more, more preferably 80% or more, uniform and continuous switching without occurrence of domains can be attained.

Also, when the amount of oligomer contained in the resin material is increased, resin cured in the form of a column is increased. Conversely, when the amount of oligomer therein is decreased and the amount of monomers is increased, resin cured in the form of a column is decreased.

The above and other objects and features of the present invention will be more apparent from the following description taken in conjunction with the accompanying drawings.

DETAILED DESCRIPTION OF THE PREFERRED EMBODIMENTS

Embodiments of the present invention will be described with reference to the accompanying drawings.

First Embodiment

Figure 1:
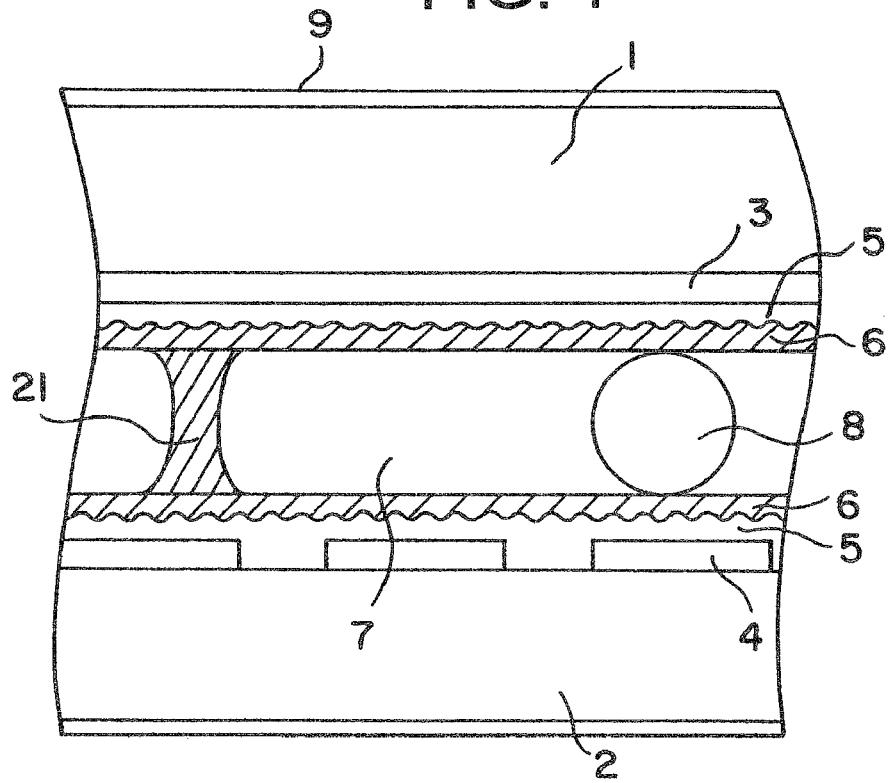
FIG. 1 shows a cross-sectional view of a liquid crystal device in accordance with a first embodiment of the present invention.

In this embodiment, a simple matrix type liquid-crystal electro-optical device shown in FIG. 1 is prepared and the respective characteristic evaluation was conducted. The substrates 1 and 2 of a liquid-crystal cell are formed of soda-lime glass having an area of 300×400 mm and a thickness of 1.1 mm. The pixel electrodes 3 and 4 made of ITO (indium tin oxide) are formed on the substrates 1 and 2 by a sputtering method, and are then subjected to patterning through a photoresist, to thereby prepare the simple matrix type liquid-crystal electro-optical device.

The orientation film material is made of polyimide resin, for example, LQ-5200 (made by Hitachi Kasei), LP-64 (made by Toray), RN-305 (made by Hitachi Chemical) or the like, and in this embodiment, LP-64 was used. The orientation films were formed by coating the material diluted with a solvent such as N-methyl-2-pyrolidone or the like on both the substrates. The coated substrates were heated at 250 to 300° C., in this embodiment, at 280° C. for 2.5 hours so that the solvent was dried and the coated films were converted into an imide and cured. The thickness of the films after being cured was 300 Å.

Subsequently, the orientation film is rubbed. The rubbing operation is made in the usual manner, and in this embodiment, the orientation film was rubbed by a roller having a diameter of 130 mm on which cloth made of rayon, cotton or the like was wound at the rotational speed of 450 rpm in one direction. A roll pushing height was 0.1 mm and a stage speed was 20 mm/sec. In this manner, the orientation films 5 were formed.

Next, as the spacer 8 for maintaining the cell interval constant, silica particles called "shinshikyu" produced by Shokubai Kasei corporation having a diameter of 1.5 μm were spread on one substrate. On the other substrate, for the purpose of fixing two substrates, a two-liquid epoxy adhesive is printed and coated on the periphery of the substrate as a sealing agent through the screen printing method, and thereafter the two substrates fixedly adhered to each other.

The mixture of the liquid-crystal material 7 and the uncured polymeric resin is injected into the cell. As the liquid-crystal material, the ferroelectric liquid crystal of phenylpyrimidine was used. The liquid crystal has a phase series of Iso-SmA-SmC*-Cry. A phase transition temperature of Iso-SmA was 85° C., and that of SmA-SmC* was 79° C. Other than the above, various kinds of ferroelectric liquid-crystal material such as biphenyl or phenyl naphthalene can be used. As the polymeric resin, an ultraviolet curable resin on the market was used. The liquid-crystal material and the uncured polymeric resin are mixed with each other at the ratio of 95:5% by weight. The mixture is stirred at the temperature at which it comes to the isotropic phase so as to be uniformly mixed with each other. The phase transition temperature of the mixture was lowered more than that of only the liquid-crystal material by 5 to 20° C.

The mixture was injected under vacuum while the liquid-crystal cell and mixture were kept at 100° C. After injection, the liquid-crystal cell was gradually cooled at the rate of 2 to 20° C./hr, in this embodiment, 3° C./hr.

The orientation state of the liquid-crystal cell was observed under the crossed-Nicols with a polarization microscope. As a result, there was obtained an extinction angle at a certain rotational angle, that is, a state in which light incident to one polarizing plate is not transmitted through the other polarizing plate as if the light is interrupted. This means that the liquid-crystal material is uniformly oriented.

Also, at this time, when the stage was turned by about 20° from the extinction angle, there was no light leakage caused by birefringence in a field of view of a microscope, but black-state portions were dotted as they were. Since uncured resin does not exhibit the birefringence, the black-state portions result from allowing the uncured resin to be separated from the liquid-crystal material and deposited into the form of a column.

Subsequently, for the purpose of curing the polymeric resin in the mixture injected into the cell, ultraviolet radiation was applied thereto. The ultraviolet radiation was applied in a direction normal to the surfaces of the substrates from both sides of the cell with the substantially same intensity. By doing so, in comparison with the case where ultraviolet radiation is applied from only one direction, the thicknesses of the resin films formed on both the substrates can be made identical to each other. This is because there is a case where the orientation controlling force for the orientation film cannot be sufficiently restrained. An irradiation intensity is 3 to 30 mW/cm$^2$, in this embodiment, 10 mW/cm$^2$, and an irradiation time is 0.5 to 5 minutes, in this embodiment, 1 minute.

After the ultraviolet radiation, the orientation state of the liquid-crystal cell was observed under the polarization microscope in the above-mentioned manner. As a result, almost no change was seen in the orientation state. No influence of ultraviolet radiation on the orientation state was found.

Next, the optical characteristics of the liquid-crystal cell was measured. The measuring method is that, in a polarization microscope having a light source of a halogen lamp, a triangular wave of ±30 V and 5 Hz is applied to the liquid-crystal cell under the crossed-Nicols, and the intensity of transmitted light of the cell is then detected by a photomultiplier. The contrast ratio measured at that time is 100, which has satisfactory characteristics as a liquid-crystal electro-optical device. Here, the contrast ratio means a ratio of the intensity of transmitted light when voltage of 30 V is applied and the intensity of transmitted light when voltage of −30 V is applied. On the other hand, in the liquid-crystal electro-optical device constituted by a single substance of the liquid-crystal material without mixing of resin, the contrast ratio was 80 under the identical conditions.

Figure 6A:
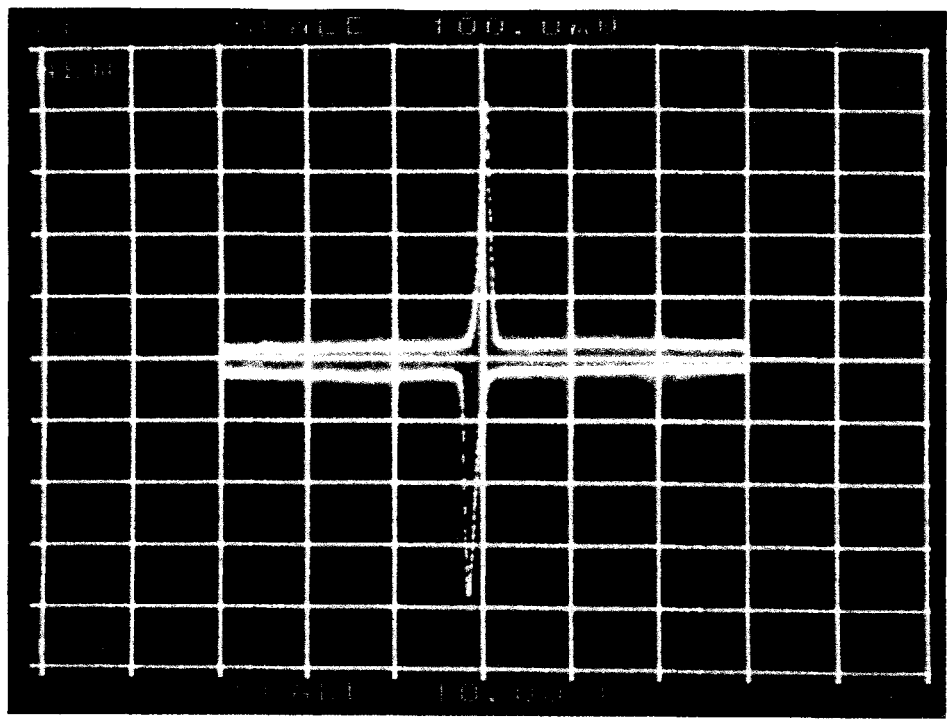
FIGS. 6A and 6B show a waveform obtained by applying a voltage across a liquid crystal device of the present invention.
Figure 6B:
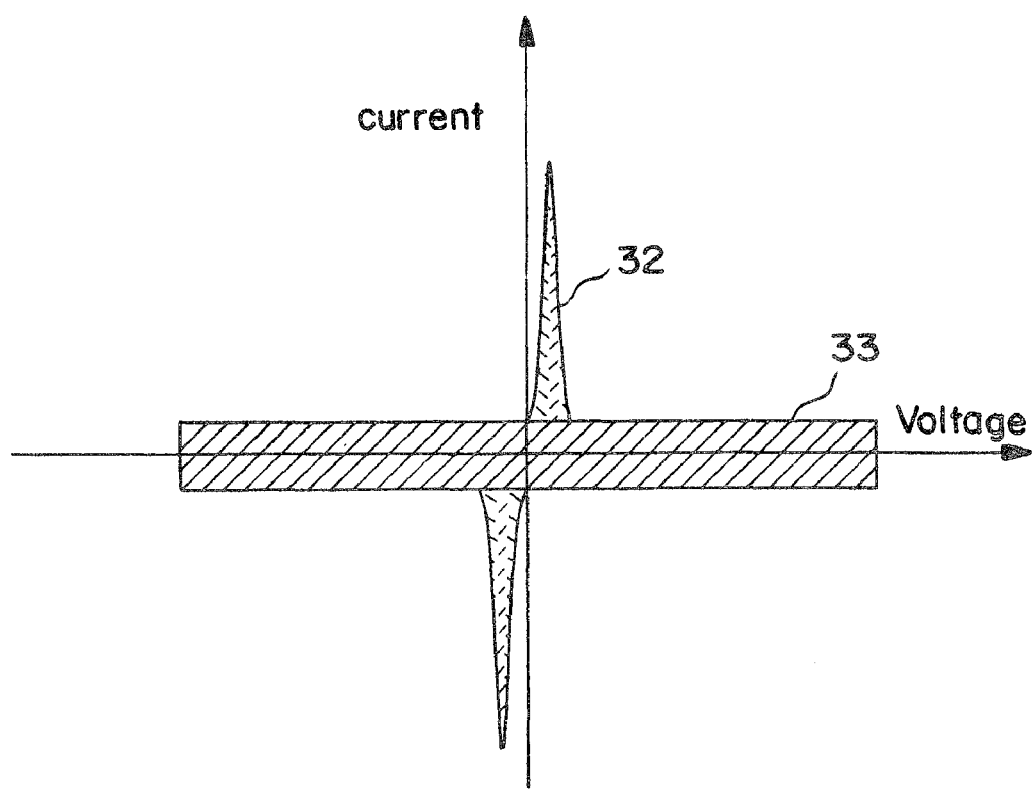

Subsequently, in the liquid-crystal electro-optical device in accordance with this embodiment, a current-to-voltage characteristic was measured. FIG. 6A shows a waveform obtained by applying a triangular waveform of ±30 V and 5 Hz to a pair of electrodes in the liquid-crystal cell constituted in accordance with the present invention, to measure applied voltage and inter-electrode current by an oscilloscope. The value of current is obtained by measuring voltage between both terminals of a resistor having 100 kΩ connected in series to one electrode. As shown in FIG. 6B which schematically shows the waveform of FIG. 6A, current 32 flowing when spontaneous polarization of the ferroelectric liquid-crystal material is inverted with a change in polarization of an electric field is rapidly changed, that is, a response speed is remarkably high. Other than the current component 32 and the capacitance component 33 between the pixel electrodes, there was no current component.

Figure 7A:
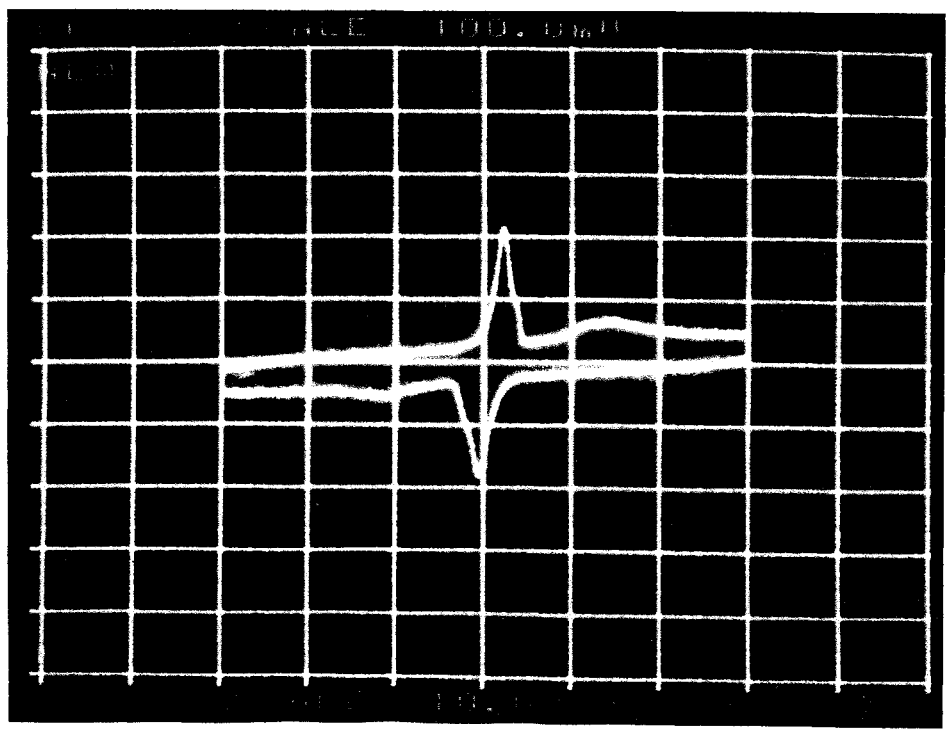
FIGS. 7A and 7B show a waveform obtained by applying a voltage across a conventional liquid crystal device.
Figure 7B:
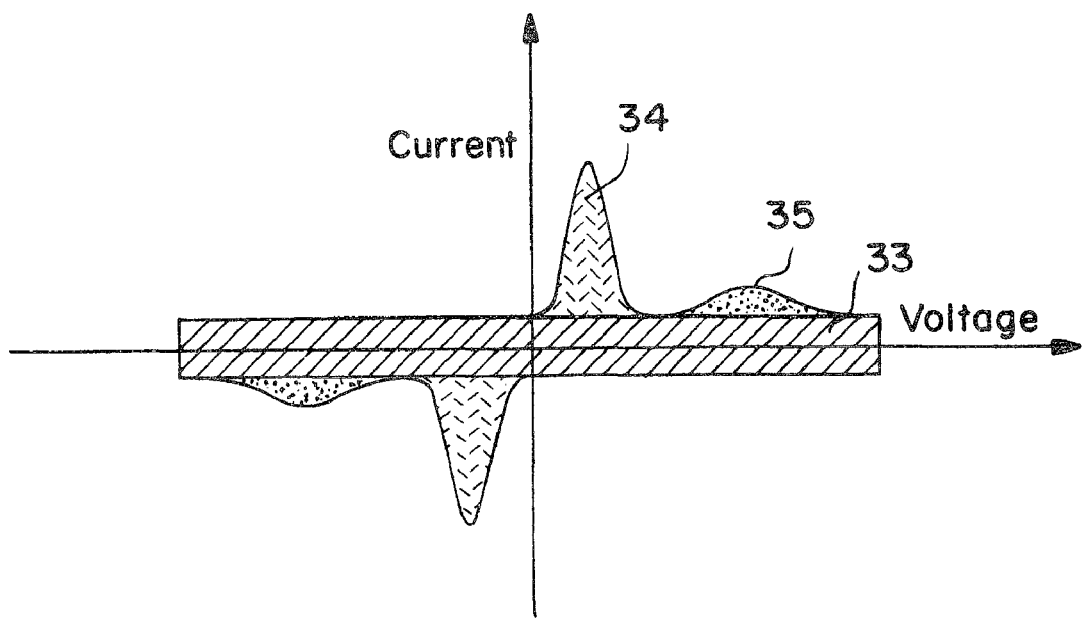

FIG. 7A shows a result obtained by measuring a current-to-voltage characteristic by an oscilloscope likewise in the conventional structural liquid-crystal cell (the same conditions except that no resin is used). As shown in FIG. 7B which schematically shows the waveform of FIG. 7A, the current component 34 when the spontaneous polarization is inverted is enlarged in width in comparison with the liquid-crystal cell of the invention shown in FIG. 6B, from which it is understood that the response speed is low. It is considered that this is because the orientation controlling force of the orientation film interferes the inversion of the spontaneous polarization. A current component 35 appears after a slight delay from switching of the spontaneous polarization. Since such surplus current flows, the response speed and the contrast ratio were lowered. It is considered that this is caused by existence of surplus charges due to impurities or the like in the liquid-crystal material.

When the whole cell is viewed by eyes, the existence of resin cannot be found at all.

Figure 8:
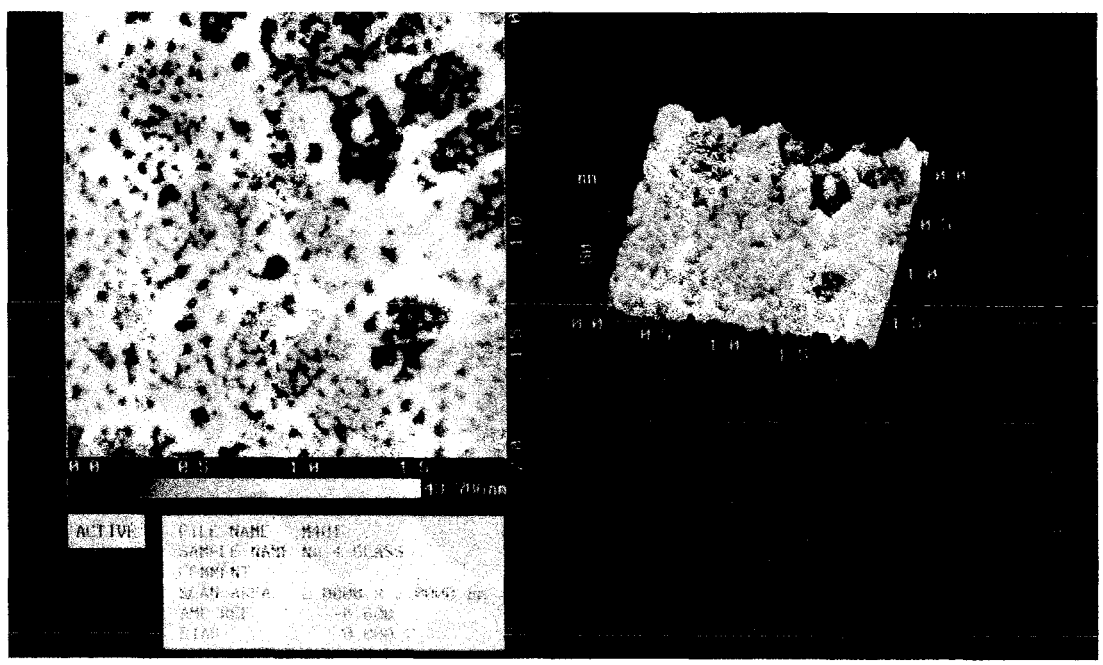
FIG. 8 is an inter-atomic force microphotograph showing a substrate surface after forming a resin in accordance with the present invention.
Figure 9:
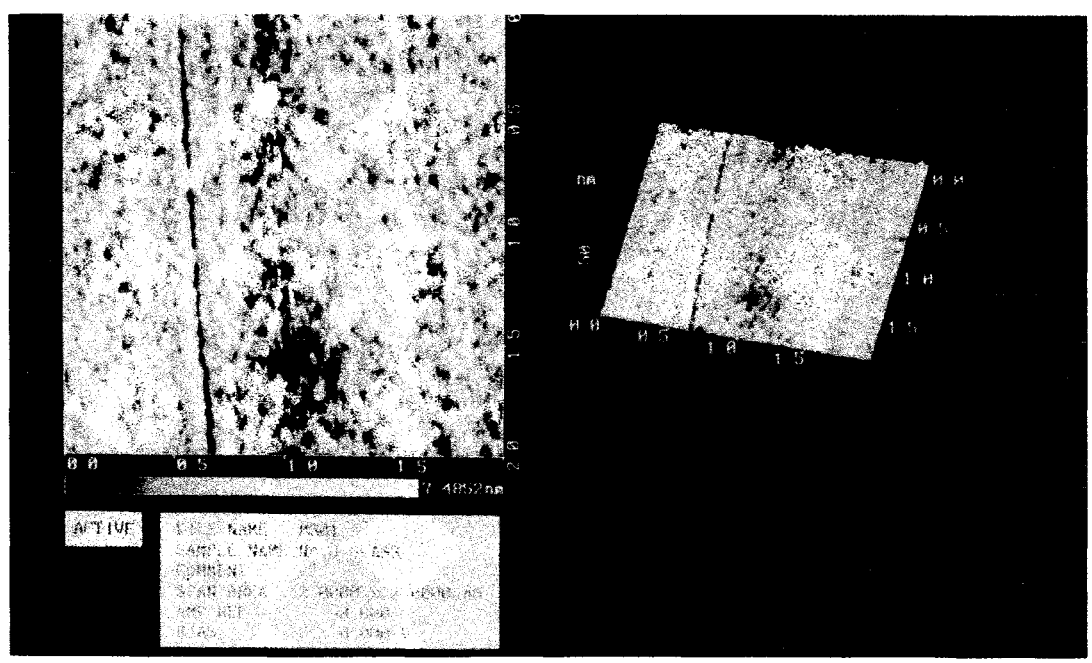
FIG. 9 is an inter-atomic force microphotograph showing a substrate surface before forming a resin of the present invention.

For the purpose of viewing a state of the resin film on the orientation film in more detail, the substrates prepared in the above-mentioned method was observed by an inter-atomic force microscope (AFM) after it was cleaned by alcohol. The result is shown in FIG. 8. For comparison, the observed image of the orientation film after being rubbed but before the mixture of the resin material and the injection of the liquid-crystal material is shown in FIG. 9. From this figure, it is apparent that a resin film having a thickness of 10 to 30 nm is formed substantially all over the surface of the orientation film, and flaws caused by the rubbing process are also coated with the resin. Therefore, it is considered that the orientation controlling force of the orientation film is remarkably restrained.

Also, because this resin film is transparent and extremely thin, transmitted light is not almost attenuated.

The phase transition temperature after the resin was cured was lowered by the degree of several ° C. in comparison with a case of only the liquid-crystal material. Here, the cell was heated to 80° C. at which the liquid-crystal material exhibits the SmA phase, and then held at that temperature for 10 to 60 minutes, in this example, for 20 minutes. Thereafter, the cell was gradually cooled to the SmC* at the rate of 3° C./hour. As a result, an orientation defect was remedied, and when the optical characteristic was measure, the contrast ratio of 120 was obtained.

On the other hand, the cell after the resin was once cured was heated to 86° C. at which the liquid-crystal material exhibits the isotropic phase, and then gradually cooled in the above-mentioned manner, as a result of which the orientation of the liquid-crystal material was partially disordered. It is apparent from this that the resin film existing between the liquid crystal and the orientation film suppresses the uniaxial orientation control force of the orientation film.

Short-circuit between the electrodes did not occur, and it was ascertained that the resin film on the orientation film functions as a short-circuit preventing film. The short-circuiting can be more surely prevented by increasing the amount of the resin material mixed and making the resin film formed thicker.

The polarizing plates 9 and 10 were provided on the outer surfaces of the substrates 1 and 2.

In this embodiment, as the resin material, there was used an ultraviolet curable resin commercially available on the market as it was. However, the amount of oligomer relative to the entire resin material is increased to change the compatibility between the liquid-crystal material and the resin, or the kinds of the orientation film material or the rubbing conditions are changed thereby being capable of controlling the amount of adhesion of the resin film to the orientation film.

Further, the kind of the orientation film or the density of rubbing is made different between both the substrates, or ultraviolet radiation is irradiated from only one side so that the amount of adhesion of the resin can be intentionally made different between both the substrates.

Second Embodiment

In this embodiment, there is shown an example embodying the active matrix type liquid-crystal electro-optical device using crystalline silicon TFTs (thin-film transistors) as switching elements for the respective pixels.

Formed on a silicon oxide film on a Corning 7059 glass plate (300×300 mm, thickness of 1.1 mm) as a substrate are pixel electrodes comprising ITO; an n-channel type crystalline silicon TFT having the mobility of 100 (cm$^2$/Vs) which is formed by crystallizing an amorphous silicon film by heating anneal at 600° C. for 48 hours in a hydrogen reducing atmosphere; signal electrodes and scanning electrodes formed of a multi-layer film made of chromium and aluminum; and a matrix of 640×480 pixels.

Then, after an ITO is formed on another glass substrate as a counter electrode, an orientation film is formed on only this substrate. As the orientation film material, LP-64 (made by Toray) was used. The manufacturing method, the manufacturing conditions, the film thickness and the rubbing conditions are the same as described in the first embodiment.

Next, as a spacer, silica particles having a diameter of 1.5 μm were dispersed on a substrate at a side where the orientation film was formed. On the other substrate, for the purpose of fixing two substrates, a two-liquid epoxy adhesive is printed and coated on the periphery of the substrate as a sealing agent through the screen printing method, and thereafter the two substrates fixedly adhered to each other.

A mixture of the liquid-crystal material and uncured resin was injected into the cell. The liquid crystal has a phase series of Iso-N*-SmA-SmC*-Cry. A phase transition temperature of Iso-N* was 81° C., that of N*-SmA* was 69° C., and that of SmA-SmC* was 54° C. The used resin and the used mixing ratio of the resin and the liquid-crystal material are identical with those in the first embodiment. The mixture was stirred at a temperature at which it came to the isotropic phase so as to be uniformly mixed with each other. The phase transition temperature of the mixture was lowered by 5 to 20° C. more than that of the case injecting only the liquid-crystal material.

The mixture was injected under vacuum with the liquid-crystal cell and mixture kept at 100° C. After injection, the liquid-crystal cell was gradually cooled at the rate of 2 to 20° C./hr, in this embodiment, 3° C./hr.

The orientation state of the liquid-crystal cell was observed under the crossed-Nicols with a polarization microscope. As a result, there was obtained an extinction position at a certain rotational angle, that is, a state in which light incident to one polarizing plate is not transmitted through the other polarizing plate as if the light is interrupted, and the liquid-crystal material was uniformly oriented.

Also, at this time, when the stage was turned by about 20° from the extinction state, there was no light leakage caused by birefringence in a field of view of a microscope, but black-state portions were dotted as they were. Since uncured resin does not exhibits the birefringency, the black-state portions are caused by allowing the uncured resin to be separated from the liquid-crystal material and deposited into the form of a column.

Subsequently, for the purpose of curing the polymeric resin mixed into the liquid-crystal material injected into the cell, ultraviolet radiation was applied from the opposed substrate side. An irradiation intensity is 3 to 30 mW/cm$^2$, in this embodiment, 10 mW/cm$^2$, and an irradiation time is 0.5 to 5 min, in this embodiment, 1 min.

After the ultraviolet radiation, the orientation state of the liquid-crystal cell was observed under the polarization microscope in the above-mentioned manner. As a result, the orientation state was not almost changed. An influence of ultraviolet radiation on the orientation state was not found.

After the substrates were cleaned by alcohol, the surfaces of both the substrates were observed with the inter-atomic force microscope (AFM) As a result, a resin film having a thickness of 10 to 30 nm was formed on the surfaces of both the substrates.

Figure 10:
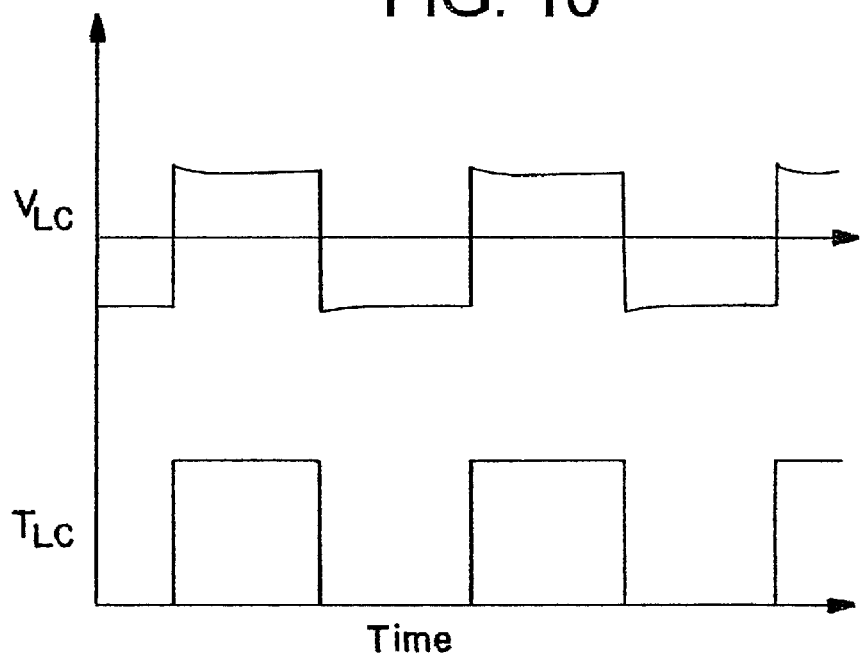
FIG. 10 shows an optical response of a liquid crystal device of a second example in this invention.

Then, the optical characteristic of the liquid-crystal cell was measured. The inter-electrode voltage and the optical response are shown in FIG. 10. The waveform of drive voltage $V_{LC}$ is voltage of 14 V, a pulse width of 1 μs and a frame width of 16 ms. The optical response is good as indicated by light transmittance $T_{LC}$ shown in the figure, and the contrast ratio at this time was 100 at the time of completion of a frame. On the other hand, the liquid-crystal cell constituted by a single substance of the liquid-crystal material without mixing of resin has the contrast ratio of 80 under the measurement in the identical conditions.

The phase transition temperature after the resin was cured was lowered by the degree of several ° C. in comparison with a case of only the liquid-crystal material. Here, the cell was heated to 70° C. at which the liquid-crystal material exhibits the N* phase, and then held at that temperature for 10 to 60 minutes, in this example, for 20 minutes. Thereafter, the cell was gradually cooled to the room temperature at the rate of 3°

C./hour. As a result, the defect of orientation was more improved, and when the optical characteristic was measured, the contrast ratio of 120 was obtained.

Likewise, the cell constituted in accordance with the present invention before the orientation is improved was heated to 55° C. at which the liquid-crystal material exhibits the SmA phase, and then held at that temperature for 20 minutes. Thereafter, the cell was gradually cooled to the room temperature at the rate of 3° C./hour. As a result, the defect of orientation was improved to the substantially same degree as that in the above-mentioned case where the cell was held at the temperature at which the liquid-crystal material exhibits the N* phase, so that the contrast ratio was improved.

On the other hand, the cell after the resin was once cured was heated to 83° C. at which the liquid-crystal material exhibits the isotropic phase, and then gradually cooled in the above-mentioned manner, as a result of which the orientation of the liquid-crystal material was partially disordered. It is apparent from this that a resin film is formed on the orientation film after the resin is cured so that the uniaxially orienting property is not given to the liquid-crystal material.

Polarizing plates were provided on the outer surfaces of the substrates to complete the device.

Third Embodiment

For experiment, a cell of one pixel was prepared and the evaluation of the respective characteristics were conducted. The fundamental structure is identical with that in FIG. 1. The size of a pixel electrode was set to 5 mm.

The orientation film material is made of polyimide resin, and in this embodiment, LP-64 (made by Toray) was used. The orientation films were diluted with solvent such as N-methyl-2-pyrolidone or the like and then coated on the substrates by the spin coating method. The coated substrates were heated at 250 to 300° C., in this embodiment, at 280° C. for 2.5 hours so that the solvent was dried and the coated films were imidized and cured. The thickness of the films after being cured was 300 Å.

Subsequently, for the purpose of optically uniaxially orienting the liquid-crystal material and arranging the layer of the liquid-crystal material normal to or inclined with respect to the substrates, the uniaxial orientation controlling force was given to the orientation film by the rubbing method. The rubbing operation was made likewise as in the usual way, that is, the orientation film was rubbed by a roller having a diameter of 130 mm on which cloth made of rayon, cotton or the like was wound at the rotational speed of 450 to 900 rpm, in this embodiment, 450 rpm in one direction. A roll pushing height was 0.1 mm and a stage speed was 20 mm/sec.

As the liquid-crystal material, the ferroelectric liquid crystal of phenylpyrimidine was used. The liquid crystal taken a phase series of Iso-SmA-SmC*-Cry. As the polymeric resin, an ultraviolet curable resin on the market was used. The polymeric resin is to prevent the separation of the liquid-crystal material from the mixture when the mixture is injected, and the polymeric resin containing monomers 90% by weight is used so that the compatibility between the liquid-crystal material and the resin is heightened. As the density of the uncured polymeric resin in the liquid-crystal material, because a resin column is formed between the upper and lower substrates thereby lowering numerical aperture if a large amount of resin is contained in the liquid-crystal resin, it is preferable that the amount of resin is small, and therefore the uncured polymeric resin was mixed with the liquid-crystal material at the ratio of 95:5% by weight. The mixture is stirred at a temperature at which it comes to the isotropic phase so as to be uniformly mixed with each other. The transition point of the mixture from the isotropic phase to the SmA phase was lowered by 5° C. more than that of only the liquid-crystal material.

The mixture was injected under vacuum while the liquid-crystal cell and mixture were at 100° C. at which the mixture exhibits the Iso phase. After injection, the liquid-crystal cell was gradually cooled to the SmC* phase. If the cell is rapidly cooled to the SmC* phase, a large amount of orientation defects occur. For this reason, the liquid-crystal cell was gradually cooled at the rate of 2 to 20° C./hr, in this embodiment, 3° C./hr as a temperature lowering rate.

The liquid-crystal cell was gradually cooled to the room temperature in the above-mentioned method, and the orientation state of the cell was observed under the crossed-Nicols by a polarization microscope. When the stage is turned, there was obtained an extinction position at a certain rotational angle, that is, a state in which light incident to one polarizing plate is not transmitted through the other polarizing plate as if the light is interrupted. This exhibits that the liquid-crystal material is uniformly oriented in such a manner that the orienting vectors of the liquid-crystal molecules are oriented in the same direction within the layers and over from layer to layer.

Also, at this time, when the stage was turned by about 20° from the extinction state, there was no light leakage caused by birefringence in a field of view of a microscope, but black-state portions were dotted as they were. This exhibits that the resin is separated and deposited in the form of a column.

Subsequently, for the purpose of curing the polymeric resin mixed into the above-mentioned liquid-crystal material, ultraviolet radiation was applied thereto. As a light source, an Hg—Xe lamp having rated power of 150 W is used. The cell was positioned so that an irradiation intensity is 3 to 30 mW/cm$^2$, in this embodiment, 10 mW/cm$^2$, and ultraviolet radiation was applied thereto. An irradiation time is 0.5 to 5 min, in this embodiment, 1 min.

After ultraviolet radiation was radiated, the orientation state of the liquid-crystal cell was observed under the polarization microscope in the above-mentioned manner. As a result, the orientation state was not almost changed. An influence of ultraviolet radiation on the orientation state was not found.

After the substrate was separated from the device and the liquid crystal was cleaned and removed from the substrate by alcohol, the resin remaining on the substrate was observed by a scanning type electronic microscope. As a result, columnar resin which had fixed both the substrates could be observed. Although it depends on the kinds of resin or liquid crystal material or the curing conditions, in most of the cases, the cured resin has a side view of a trapezoid or a rectangle, a top cross-section (face viewed from a direction normal to the substrate) of a round trapezoid or rectangle, a circle or an elliptical, and is plateau-shaped as a whole. These resin has an upper cross-section whose size (a diameter in the case of a circle) is about several μm to several tens μm and whose height is equal to a substrate interval. There are various shapes of resin such that the height is about 1/10 of the thickness, or the size of the upper section is nearly equal to the height so as to be die-shaped.

The shape of resin is also changed depending on the phase transition series of the liquid-crystal material, the cooling process or the like. There are a shapeless resin and a resin having a longitudinal axis in the uniaxially orienting direction. Also, an interval between the existing resin cured in the form of a column was about 10 to 100 μm.

Under the above-mentioned orienting state, the contrast ratio was measured. The measuring method is that, in a polarization microscope having a light source of a halogen lamp, a triangular wave of ±30 V and 5 Hz is applied between the electrodes of the liquid-crystal cell under the crossed-Nicols, and the intensity of transmitted light of the cell is then detected by a photo-multiplier. The contrast ratio was 120.

Subsequently, the switching process of the cell was observed through the same optical system as the above. A triangular wave having a low frequency was applied to the cell. Different from the switching operation followed by the generation of a domain as in the conventional ferroelectric liquid-crystal electro-optical device, switching between brightness and darkness made the entire amount of transmitted light uniformly change, depending on the strength of an electric field.

Figure 11:
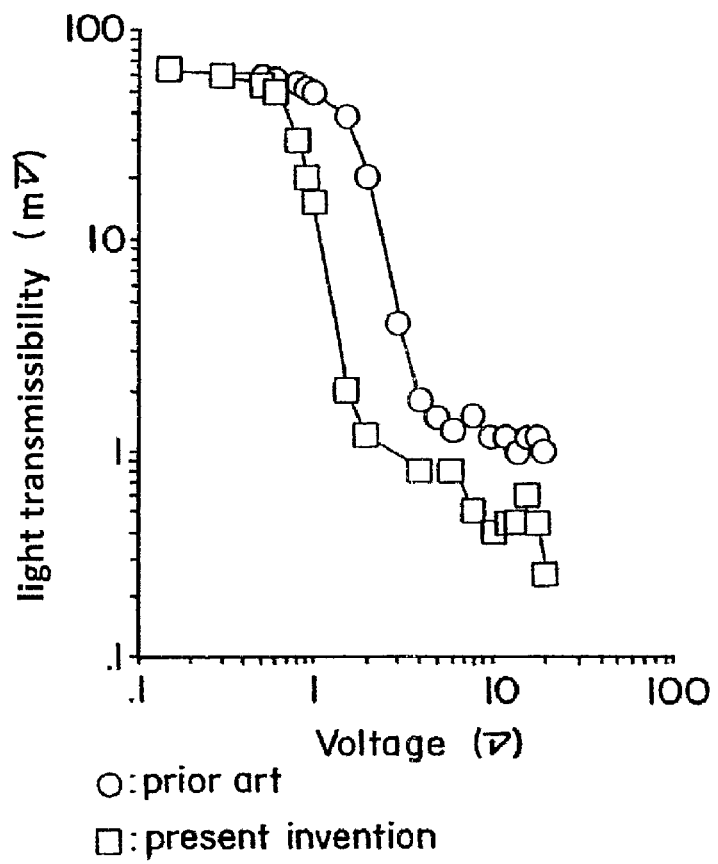
FIG. 11 shows a transmissibility-voltage characteristics of liquid crystal devices of the present invention and the prior art.

Then, the contrast-to-voltage characteristic was measured. The measuring method is that first the cell is positioned at the extinction position when applying d.c. 20 V, and then voltage is increased from 0 V to 20 V, and the intensity of transmitted light is measured. The result is shown in FIG. 11. The characteristic values of the present invention are indicated by square plots, and a threshold value was about 0.8 V.

Figure 12:
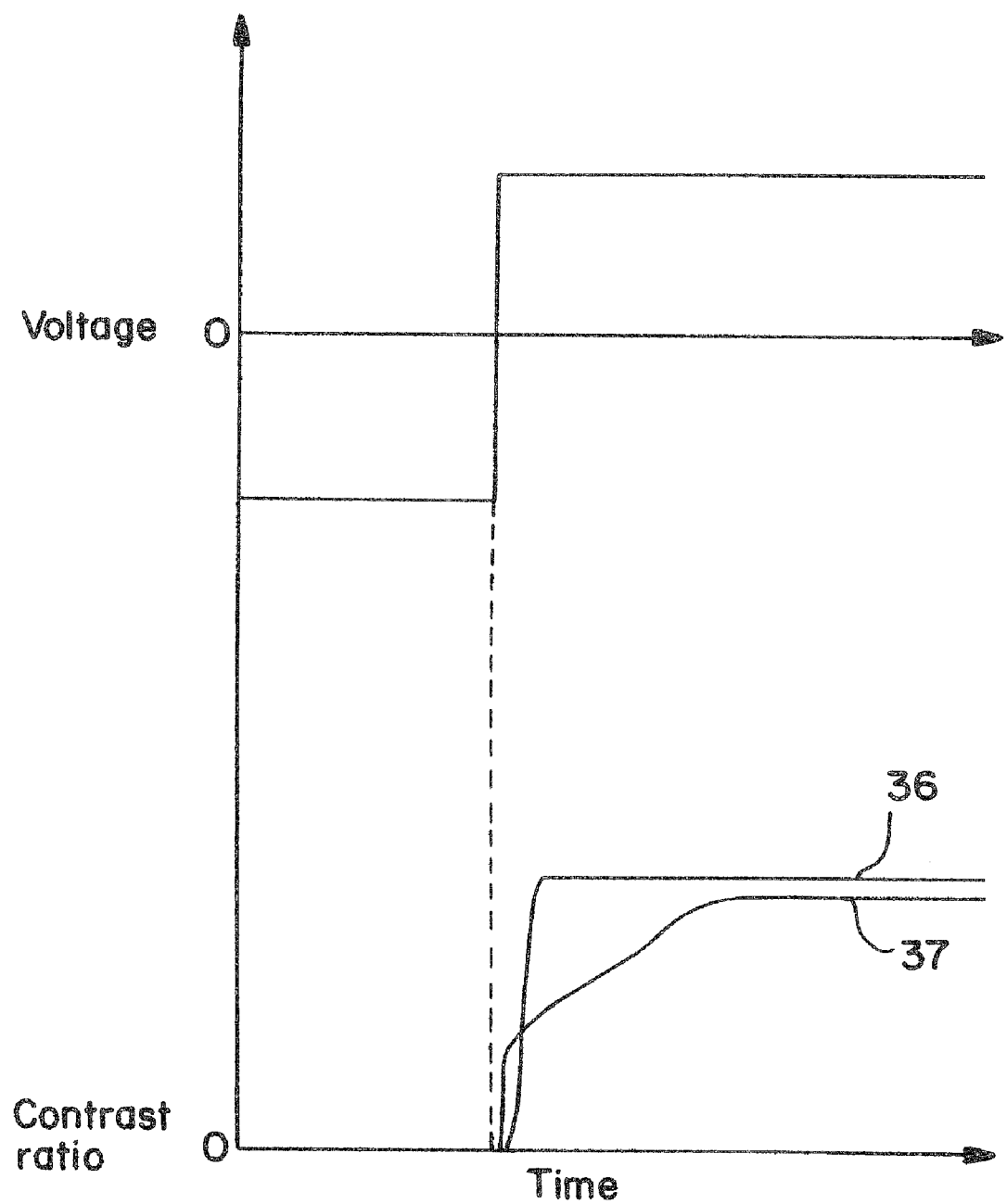
FIG. 12 shows a response characteristics of liquid crystal devices of the present invention and the prior with respect to an input voltage.

The response of the liquid-crystal material when the direction of an electric field is inverted was measured. The states of the changes in a drive waveform and the contrast are shown in FIG. 12. At this time, the drive waveform was a square wave of ±3 V and 5 Hz. A response waveform 36 in the device according to the present invention rapidly rises after the polarity of the square wave is inverted, which is of a one-step response.

Figure 13:
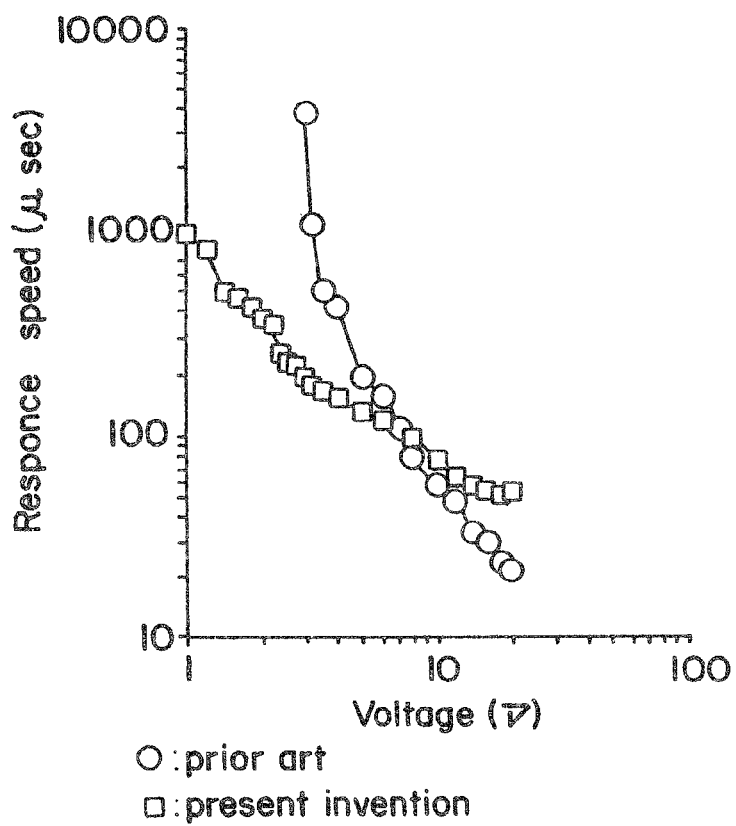
FIG. 13 shows a response speed-input voltage characteristics with respect to liquid crystal devices of the prior art and the present invention.

Further, a dependency of the response of the liquid-crystal material on voltage was investigated. The drive waveform was a square waveform of 5 Hz. The result is indicated by the square plots in FIG. 13. In the cell of the present invention, a high response speed of about 1 msec is exhibited even in a low voltage region. Also, in logarithmic coordinates, voltage and the response speed have a linear relationship. That is, the strength of an electric field and the response speed always have a given relationship. This suggests that the cell of this embodiment operates at the gold stone mode.

Subsequently, the current-to-voltage characteristic was investigated by measuring a current flowing between the electrodes when a triangular waveform of ±30 V and 5 Hz is applied to the liquid-crystal cell. There was no current components except for a capacitance component between the electrodes and a current flowing when spontaneous polarization of the ferroelectric liquid-crystal material is inverted as the polarity of the electric field is changed.

Next, the pulse memory property of the cell was investigated. The drive waveform was 200 µm in pulse width and 20 ms in frame width. There is substantially no pulse memory property.

Also, the optical switching property was investigated by applying a pulse of 14V, 1 µs with a frame duration 16 ms, using a driving circuit composed of TFTs externally connected to the cell. As a result, an excellent optical response is obtained, and the contrast ratio at this time was 120 at the time of completion of a frame.

For the purpose of viewing a state of the resin film in more detail, the substrates prepared in the above-mentioned manner was observed by an inter-atomic force microscope (AFM) after it was cleaned by alcohol. According to this observation, a coating of polymeric resin was formed on the surface of the orientation film. Although it depends on the manufacturing conditions, the thickness of the coating was about 10 to 30 nm, and the coating had minute irregularity. There were a portion where a resin film does not almost exist, and a portion where a resin film having a thickness of about 50 nm exists.

For comparison, a cell having the same structure except that no resin is contained was observed. First, in the observation of the switching process using the triangular waveform, switching accompanied by occurrence of a domain was made. Also, as to a dependency of the intensity of transmitted light on voltage, a threshold value was about 2 V as indicated by circular plots in FIG. 11. Also, the response when the polarity of an electric field is inverted had an initial rapid rising as indicated by 37 in FIG. 12, but had a slow change from the middle thereof, which was of a two-step response. As a result of investigating a dependency of the response speed on voltage, the response speed rapidly becomes slow when voltage is 3V or less, as indicated by circular plots in FIG. 13, so that a relationship between the strength of the electric field and the response speed is not linear.

Further, as a result of measuring a current-to-voltage characteristic, there was observed a peak representing an undesired current component caused by electric charges contained in the liquid crystal. Also, it was found that the current component related to the inversion of the spontaneous polarization has a low peak value and a wide width in comparison with the device constituted in accordance with the present invention, as a result of which it is understood that the response speed is lowered. On the other hand, the pulse memory property was relatively good.

Fourth Embodiment

Figure 2:
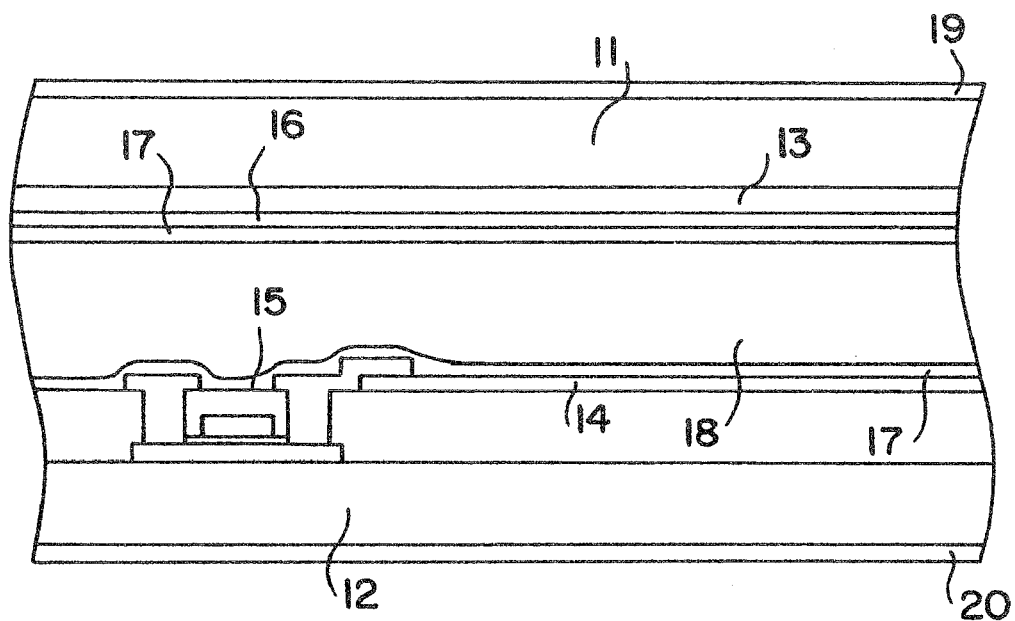
FIG. 2 shows a cross-sectional view of a liquid crystal device in accordance with a second embodiment of the invention.
Figure 3:
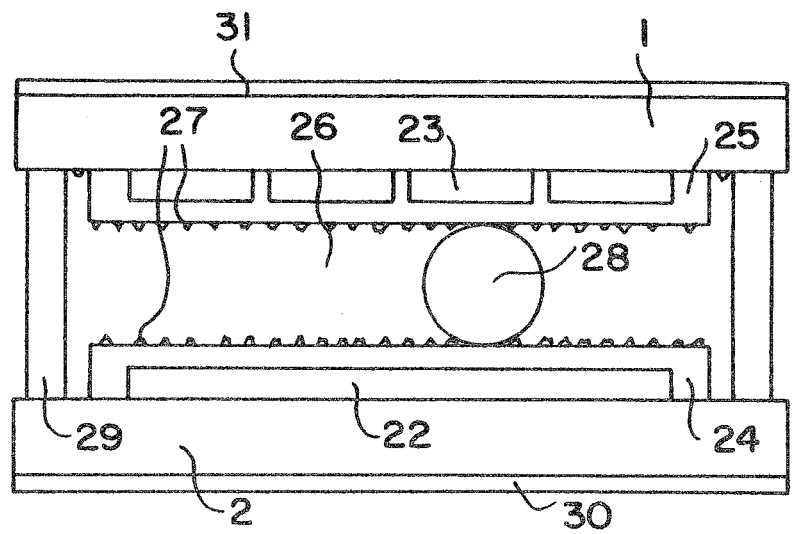
FIG. 3 shows a cross-sectional view of a liquid crystal in accordance with another example of the present invention.
Figure 4:
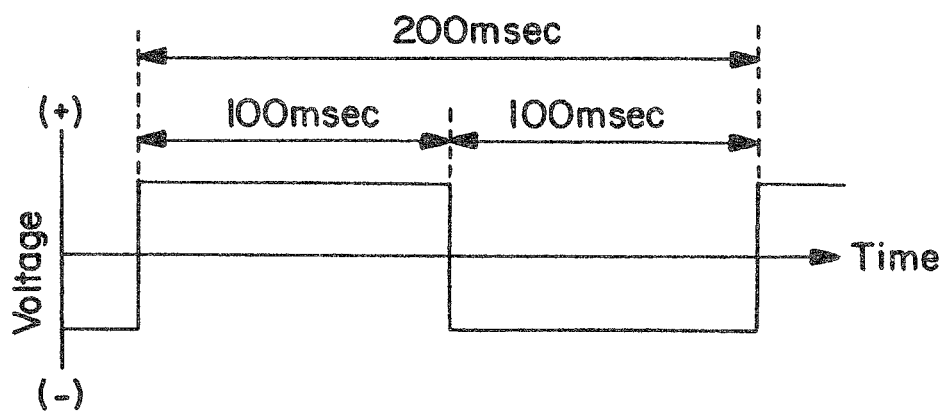
FIG. 4 shows an optical characteristics in the case where the conventional SSFLC device is driven by a square wave.
Figure 4:
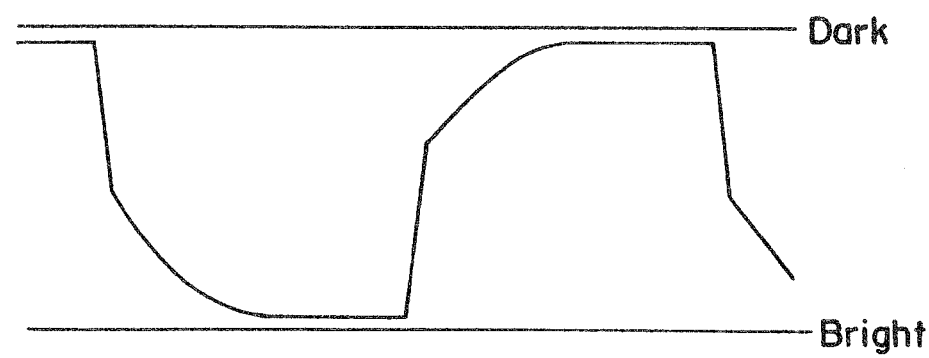
Figure 5:
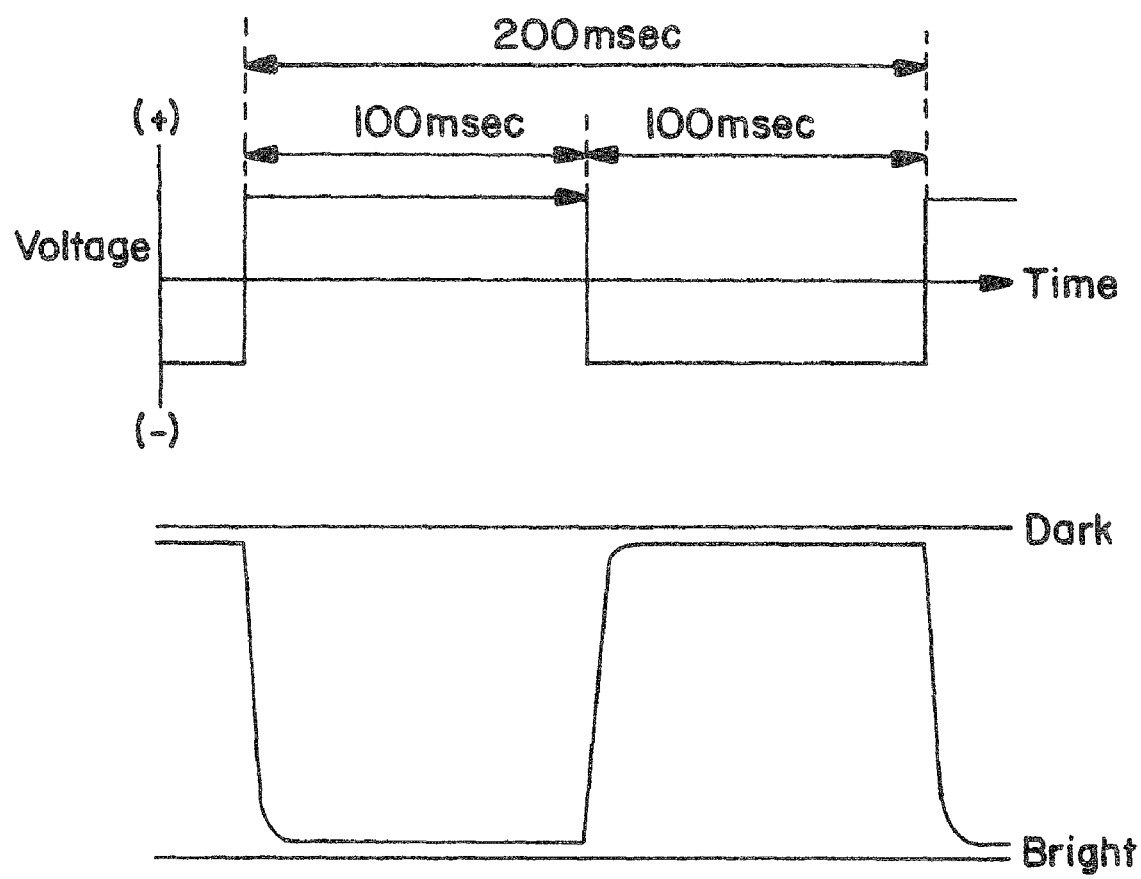
FIG. 5 shows an optical characteristics of the liquid crystal device of the present invention.

An example of the active matrix drive type device providing a crystalline silicon TFT as a switching element for each pixel will be described with reference to FIG. 2.

Formed on a silicon oxide film (not shown in the figure) on a Corning 7059 glass plate (300×300 mm, thickness of 1.1 mm) as a substrate 12 are pixel electrodes 14 formed of ITO; and n-channel type crystalline silicon TFT 15 having the mobility of 100 (cm$^2$/Vs) which is formed by crystallizing an amorphous silicon film by heating at 600° C. for 48 hours under a hydrogen reducing atmosphere; signal electrodes and scanning electrodes formed of a multi-layer film made of chromium and aluminum; and a matrix of 640×480 pixels.

Next, a film of ITO having 1200 Å was formed on a soda-lime glass substrate as an opposed substrate 11 by a sputtering method to provide an opposed electrode. As the electrode material, SnO$_2$ (tin oxide) or the like can be also used. Further, as the substrate material, inorganic material such as glass or quartz, or organic material such as acrylic resin or polyethylene resin can be used.

An orientation film 16 is formed only on the substrate on which the opposed electrode is formed to provide the so-called one-sided orientation. The orientation film material can be made of polyimide or polyamide resin, or resin such as polyvinyl alcohol. Polyimide resin is for example, LQ-5200 (made by Hitachi Kasei), LP-64 (made by Toray), RN-305 (made by Nissan Chemical) or the like, and in this embodiment, LP-64 was used. The formation of the orientation film was carried out entirely in the same manner as in the first embodiment.

For the purpose of optically uniaxially orienting the liquid-crystal material and arranging the layer of the liquid-crystal material normal to or inclined with respect to the substrates, the uniaxial orientation controlling force was given to the orientation film by the rubbing method. The rubbing operation was made likewise as in the usual way, that is, the orientation film was rubbed by a roller having a diameter of 130 mm on which cloth made of rayon, cotton or the like was wound at the rotational speed of 450 to 900 rpm, in this embodiment, 450 rpm in one direction. A roll pushing height was 0.1 mm and a stage speed was 20 mm/sec.

It is proper that a substrate interval is 1 to 10 μm, and a spacer material is silica, alumina or the like. In this embodiment, in order to maintain the cell gap constant, as a spacer, silica particles "shinshikyu" (made by Shokubai Kasei) having a diameter of 1.5 μm were spread on the substrate at a side where the orientation film is coated. On another substrate, for the purpose of fixing the two substrates, a two-liquid epoxy adhesive is printed and coated on the periphery of the substrate as a sealing agent through the screen printing method, and thereafter the two substrates fixedly adhered to each other.

The mixture of the liquid-crystal material 18 and the uncured polymeric resin was injected into the cell. As the liquid-crystal material, the ferroelectric liquid crystal of phenylpyrimidine was used. The liquid crystal takes a phase series of Iso-SmA-SmC*-Cry. As the polymeric resin, an ultraviolet curable resin on the market was used. In order to prevent the separation of the liquid-crystal material from the resin when the mixture is injected, and the polymeric resin containing the amount of monomers of 90% by weight was used so that a compatibility between the polymeric resin and the liquid-crystal material is heightened. As to the concentration of the uncured polymeric resin in the liquid-crystal material, since if a large amount of resin is contained in the liquid-crystal resin a resin column is formed between the upper and lower substrates thereby lowering numerical aperture, it is preferable that the amount of resin is small, and therefore the uncured polymeric resin was mixed with the liquid-crystal material at the ratio of 95:5% by weight. The mixture is stirred at the temperature at which it comes to the isotropic phase so as to be uniformly mixed with each other. The transition point of the mixture from the isotropic phase to the SmA phase was lowered by 5° C. more than that of only the liquid-crystal material.

The mixture was injected under vacuum while the liquid-crystal cell and mixture were at 100° C. at which the mixture exhibits the Iso phase. After the injection, the liquid-crystal cell was gradually cooled to the SmC* phase. If the cell is rapidly cooled to the SmC* phase, a large amount of orientation defects occur. For this reason, the liquid-crystal cell was gradually cooled at the rate of 2 to 20° C./hr, in this embodiment, 3° C./hr as a temperature lowering rate.

The liquid-crystal cell was gradually cooled to the room temperature in the above-mentioned method, and the orientation state of the cell was observed under the crossed-nicol by a polarization microscope. When the stage is turned, there was obtained an extinction position at a certain rotational angle, that is, a state in which light incident to one polarizing plate is not transmitted through the other polarizing plate as if the light is interrupted. This exhibits that the liquid-crystal material is uniformly oriented in such a manner that the orienting vectors of the liquid-crystal molecules are oriented in the same direction within the layers and over from layer to layer.

Also, when the stage was turned by about 20° from the extinction state, there was no light leakage caused by birefringence in a field of view of a microscope, but black-state portions were dotted as they were. This exhibits that the resin is separated and deposited in the form of a column.

Subsequently, for the purpose of curing the polymeric resin mixed into the above-mentioned liquid-crystal material, ultraviolet radiation was applied thereto. As a light source, an Hg—Xe lamp having rated power of 150 W was used. The cell was positioned so that an irradiation intensity is 3 to 30 mW/cm², in this embodiment, 10 mW/cm², and ultraviolet radiation was applied thereto. An irradiation time is 0.5 to 5 min, in this embodiment, 1 min.

After ultraviolet radiation was radiated, the orientation state of the liquid-crystal cell was observed under the polarization microscope in the above-mentioned manner. As a result, the orientation state was not almost changed. An influence of ultraviolet radiation on the orientation state was not found. At this time, the resin in the form of a column allows the upper and lower substrates to adhere to each other so as to prevent a distance between the substrates from being enlarged, as a result of which, even though the liquid crystal is enlarged in area, the layer structure of the liquid-crystal material can be prevented from being destroyed.

The device thus manufactured had the contrast ratio of about 120. A triangular wave having a low frequency was applied between the electrodes, and the switching state was observed by a polarization microscope. As a result, a region to which voltage was applied was uniformly changed in the amount of transmitted light without occurrence of a domain.

Polarizing plates 19 and 20 were stuck on both the substrates, and a driving circuit is connected to the device to thereby complete a liquid-crystal electro-optical device. Rewrite on one screen is performed for 1/60 second, and the magnitude of applied voltage is controlled so that display with 256 gradations can be realized.

The substrates prepared in the above-mentioned manner was observed by an inter-atomic force microscope (AFM) after it was cleaned by alcohol. According to this observation, a coating of polymeric resin having a thickness of about 10 to 30 nm was formed on both of the surface of the orientation film and the surface of the pixel electrodes.

Viewing the electrode portion of the liquid-crystal cell by eyes, the existence of the resin cannot be found at all. From these results, it can be found that, if the rate of the resin material occupying an area of a display portion is about 0.1 to 20%, then it is not inferior to the conventional device.

In this manner, the cell having the uniform inter-electrode distance can be manufactured. Even though the completed cell is located vertically, the uniformity of display or the like could not be recognized at all. The deformation of the substrates or the like was not generated, and the layer structure of the ferroelectric liquid crystal used in this embodiment was not destroyed.

In this embodiment, as the switching elements connected to the pixels, the n-channel type thin-film transistor was used. However, it may be of the p-channel type, or constituted by a complementary type using the p-channel type thin-film transistor and the n-channel type thin-film transistor. Also, it may be of a structure using a non-linear element such as an MIM diode or the like.

Fifth Embodiment

Figure 14:
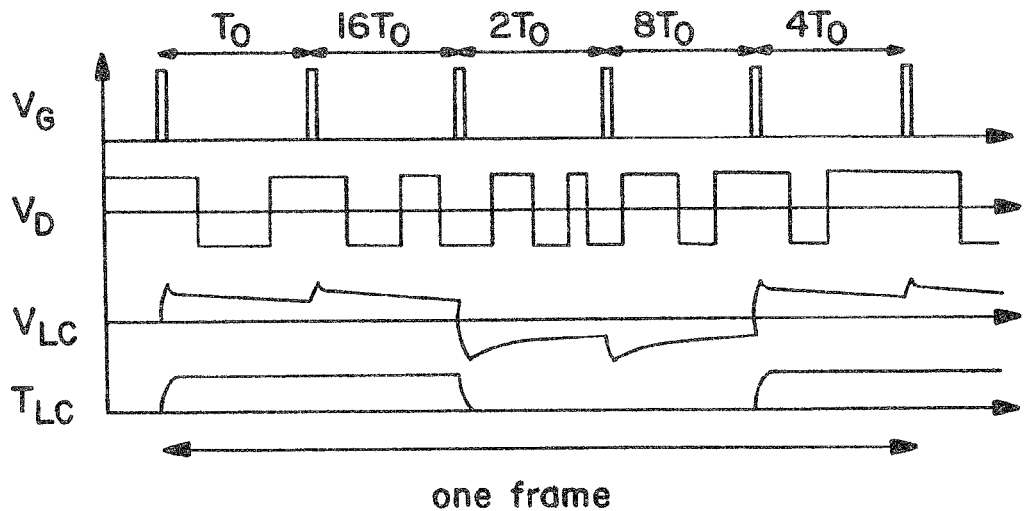
FIG. 14 shows waveforms for driving an pixel in accordance with a driving method of the present invention.

In the liquid-crystal electro-optical device of the fourth embodiment, display with 32 gradations was performed by digital gradation driving. FIG. 14 shows changes of gate voltage $V_G$, drain voltage $V_D$, pixel voltage $V_{LC}$ and the transmittance $T_{LC}$ of the pixel for one pixel of interest in the display method used therein. First, as shown in FIG. 14, one frame is constituted by five sub-frames. The durations of the respective sub-frames are 0.5 msec in a first sub-frame, 8 msec in a second sub-frame, 1 msec in a third sub-frame, 4 msec in a fourth sub-frame and 2 msec in a fifth sub-frame (In FIG. 14, a distance of the respective sub-frames is the same, accordingly one frame becomes 15.5 msec. That is, if the duration of the first sub-frame is the shortest duration $T_0$, the durations of the second sub-frame and so on are $16T_0$, $2T_0$, $8T_0$ and $4T_0$, and 32 gradations can be displayed by combination of the durations of these five sub-frames.

Within one sub-frame, first a square pulse signal is applied to a scanning line as gate voltage $V_G$ to turn on the gate electrodes of TFTs for pixels of one line (laterally, 640). On the other hand, to signal lines connected to the drain electrodes of the respective TFTs, a pulse train representing any one of positive and negative states is applied as drain voltage $V_D$. The pulse train includes the total scanning number in the sub-frame interval, in this embodiment, 480 pieces of information, and the respective information is synchronous with scanning of each line. Scanning is performed for all of 480 lines to determine on-state or off-state of all the pixels, to thereby complete one sub-frame. As mentioned above, the durations of the respective sub-frames are different from each other. During the above operation, each pixel is maintained in an on-state or in an off-state by keeping the transmittance $T_{LC}$ constant regardless of the fact that the pixel potential $V_{LC}$ gradually approaches 0 due to natural discharge. In this embodiment, the transmittance $T_{LC}$ during the operation is remarkably stabilized and not changed even though a time is elapsed, or the like.

In this way, when all the sub-frames are completed, the gradation display within one frame can be digitally realized. The pulse width of the scanning signal applied to the gate electrode of each TFT is set to 2 μsec, the wave height of the pulse is −15 V, and the data signal applied to the drain electrode is ±10 V. In this device, the irregularity and flicker and the like of display did not appear at all, and the contrast ratio of 120 was obtained at 32 gradations.

In this case, when the data signal applied to the drain electrode was set to ±5 V, it was operated with no trouble.

Also, the gradation display due to the number of frames is not made, one-screen rewrite is performed for 1/60 min to change the strength of an electric field. That is, when 32-gradation display was performed by controlling the magnitude of applied voltage, the gradation was satisfactorily definitely displayed.

Furthermore, 16 gradations by the number of frames and 16 gradations by applied voltage were displayed thereby being capable of performing 256-gradation display.

In this embodiment, as the switching elements connected to the pixels, the n-channel type thin-film transistor was used. However, it may be of the p-channel type, or constituted by a complementary type using the p-channel type thin-film transistor and the n-channel type thin-film transistor. Also, it may be of a structure using a non-linear element such as an MIM diode or the like.

Figure 15:
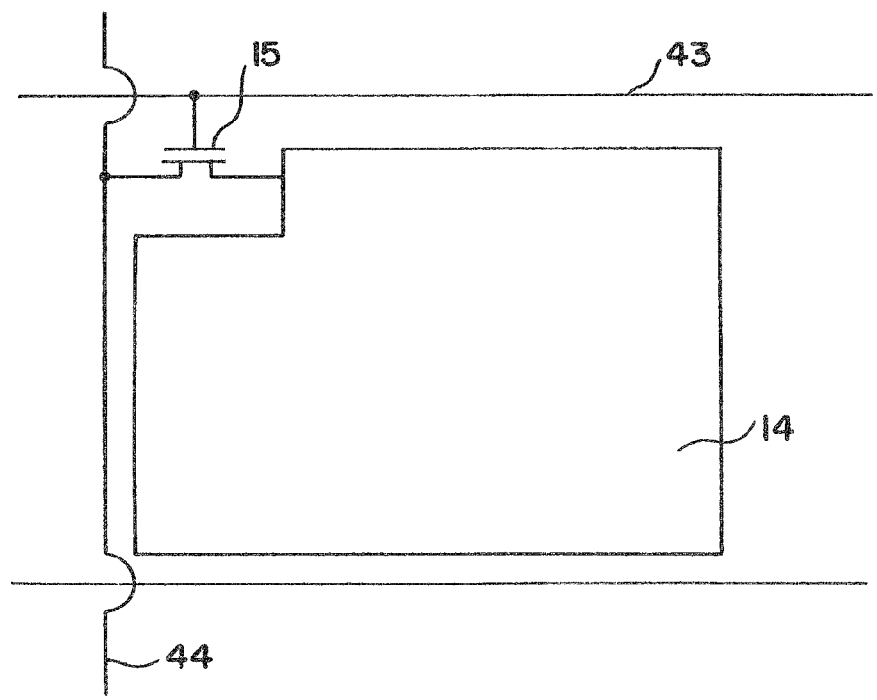
FIGS. 15 and 16 shows one pixel of an active matrix circuit of the present invention.

In this embodiment, as shown in FIG. 15, there was used a drive system in which one thin-film transistor 15 was used for one pixel, TFTs of one line are turned on by applying a signal to a scanning electrode 43 connected with the gate electrode of each TFT, and a transmitted or non-transmitted signal or a gradation signal is applied by a signal electrode 44 connected with a source or drain electrode to perform display.

Figure 16:
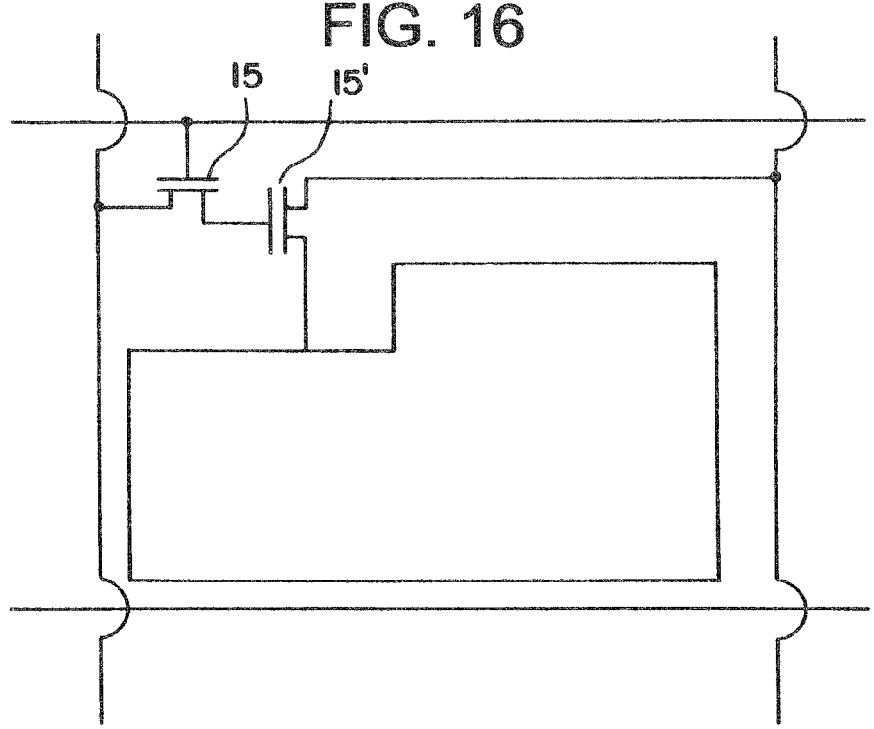

Other than this system, the present invention is effective to, for example, a drive system in which rewrite is performed every pixel using two TFTS as shown in FIG. 16.

Sixth Embodiment

In this embodiment, a film made of indium tin oxide (ITO) is formed as an electrode on a glass substrate of 10 cm☐ by a sputtering method or a vapor phase deposition method so that the film has a thickness of 500 to 2000 Å, in this embodiment, 1000 Å, and then electrodes are patterned in the form of a stripe through a usual photolithographic process. Polyimide is coated on the substrate by a spin coating method and sintered at 280° C. As polyimide, RN-305 (made by Nissan Chemical) and LP-64 (made by Toray) were used. The thickness of polyimide is 100 to 800 Å, in this embodiment, 150 Å. The substrates were subjected to a rubbing process to perform an uniaxially orienting process. Silica particles were spread on one substrate. On another substrate, sealing material made of epoxy resin was formed by the screen printing method. Both the substrates have an inter-electrode distance of 1.5 μm and are faced to each other so that the stripe-shape electrodes are orthogonal to each other, thereby forming a simple matrix type cell having the number of pixels of 640×480.

The liquid-crystal material used in this embodiment is CS 1014 which is ferroelectric liquid-crystal made by Chisso Corporation. Ps of this liquid crystal is 5.4 nC/cm², and a phase series is I (isotropic phase)-N (nematic phase)-A (smectic A phase)-C*(smectic C* phase).

The resin material used in this embodiment is obtained by mixing acrylic monomers on the market having the molecular weight of about 150 to 200 with urethane oligomer having the molecular weight of about 1500 to 3000 at the ratio of 90:10% by weight and then mixing them with a reaction initiating agent of about 3% by weight on the market (hereinafter referred to as "uncured resin material").

The liquid-crystal material and the uncured resin material 5% were mixed with each other at the ratio of 95:5% by weight. The mixed resin was heated and stirred to 90° C. at which the liquid crystal exhibits the isotropic phase so as to be more mixed into the liquid-crystal material. As a result, the resin was uniformly mixed into the liquid-crystal material.

The cell and the liquid-crystal mixture were heated at 90° C., and then gradually cooled to the room temperature at 2 to 20° C./hr, in this embodiment, at 2° C./hr after the mixture was dispersed into the cell. After gradually cooling, the orienting state at the room temperature was observed by a polarization microscope. Although the resin material which was dotted in the cell and column-shaped could be recognized, the formation of resin on the substrates could not be recognized. However, the orientation of the liquid-crystal material, likewise as the liquid-crystal material to which no resin is added, was uniaxially oriented along a rubbing direction of the orientation film, resulting in an excellent extinction position.

Ultraviolet radiation was applied to the cell in such a manner that an irradiation intensity is 3 to 30 mW/cm² and an irradiation time is 0.5 to 5 min, in this embodiment, 20 mW/cm² and 1 min, so that the resin is cured. After irradiation of ultraviolet radiation, the liquid crystal was also uniaxially oriented along the rubbing direction of the orientation film, thus obtaining an excellent extinction position.

As a result of observing a change in the transmitted light with a change in applied voltage of the cell, the gradation was continuously changed from a dark state to a bright state or vice versa, thereby enabling a halftone display. Occurrence of a domain could not be recognized visually.

Both the substrates of this cell were separated from the cell and were left in an oven at 200° C. for 5 hours so that liquid crystal was volatilized. Thereafter, as a result of observing the substrates by the polarization microscope, it was ascertained that it was not polarized, and the resin formed on the substrates was observed through SEM.

Figure 17A:
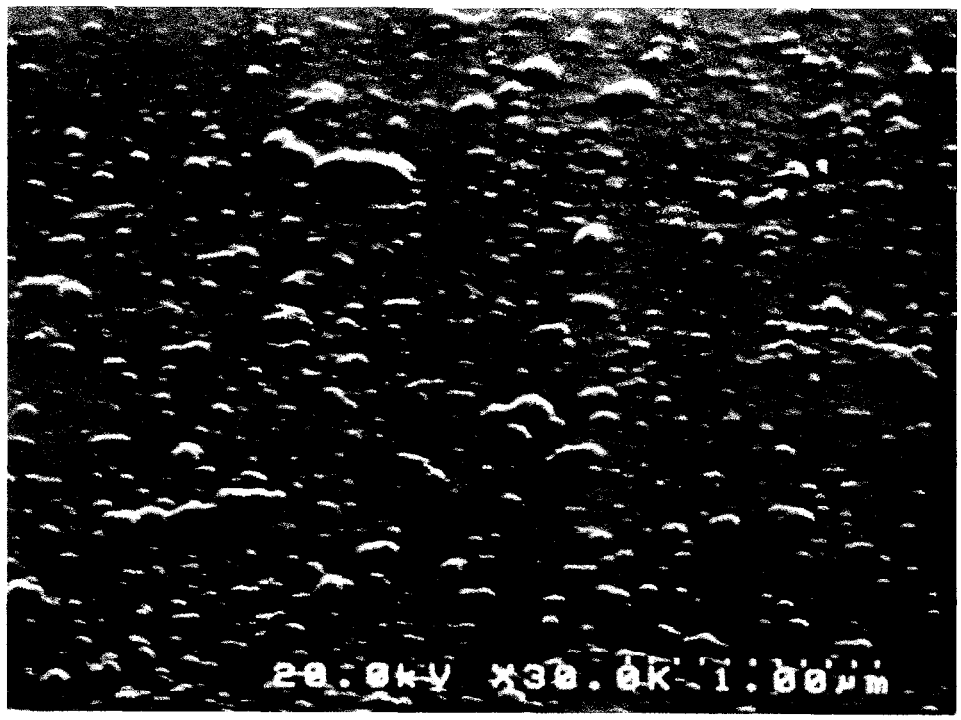
FIGS. 17A and 17B are SEM photographs showing the surface of the substrates on which a resin is formed in accordance with the present invention.
Figure 17B:
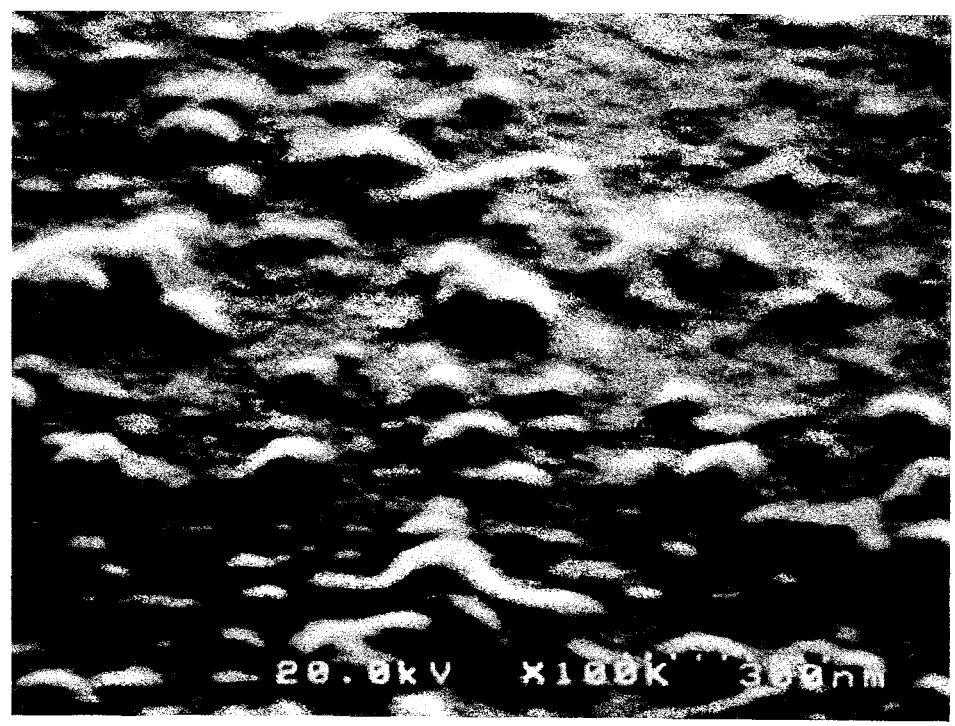

FIGS. 17A and 17B show SEM photographs representing a fine pattern thus formed on the substrates. FIG. 17B is an enlargement of FIG. 17A. As shown in the figures, a large number of fine protrusions made of resin having a height of 10 nm and a diameter of 500 nm or less, typically about several tens to several hundreds nm were observed. The protrusions were wholly uniformly dispersed on the surface thereof, and also there were partially portions where a plurality of protrusions continued.

Also, in this embodiment, the number of pixels may be set to 1920×480, and there may be provided color filters of three colors consisting of red, blue and green so that full-color display of 640×480 can be performed. If it is 256 gradations, colors of about 1670 ten thousands can be displayed.

Seventh Embodiment

In this embodiment, the structure of a device, resin material, a manufacturing method, and a mixing ratio of liquid-crystal material and uncured resin material were identical with those in the sixth embodiment. The liquid-crystal material in this embodiment was ferroelectric liquid crystal of biphenyl having Ps of 20.7 nC/cm$^2$ and a phase series of I-A-C*. The orienting state of the liquid-crystal material of a cell formed was observed under a polarization microscope. As a result, likewise as in a case where no resin is mixed, the liquid-crystal material was optically uniaxially oriented along the rubbing direction of the orientation film, resulting in an excellent extinction position.

As a result of observing a change in the transmitted light with a change in applied voltage of the cell, the gradation was continuously changed from a dark state to a bright state or vice versa, thereby enabling a halftone display. Occurrence of a domain could not be recognized visually.

Both the substrates of this cell were separated from the cell and were left in an oven at 280° C. for 5 hours so that liquid crystal was volatilized. Thereafter, as a result of observing the substrates by the polarization microscope, it was ascertained that it was not polarized, and the resin on the substrates was observed through SEM. As a result, a large number of fine protrusions made of resin having a height of about 30 nm and a diameter of about 90 nm on average were observed.

Eighth Embodiment

In this embodiment, the structure of a device, resin material, a manufacturing method, and a mixing ratio of liquid-crystal material and uncured resin material were identical with those in the sixth embodiment. However, as the uncured resin material, there was used resin material obtained by mixing acrylic monomers on the market having the molecular weight of about 100 to 150 with urethane oligomer having the molecular weight of about 1000 to 2000 at the ratio of 65:35% by weight and then mixing them with a reaction initiating agent of about 3% by weight on the market.

The orienting state of the liquid-crystal material of a cell formed was observed under a polarization microscope. As a result, likewise as in a case where no resin is mixed, the liquid-crystal material was optically uniaxially oriented along the rubbing direction of the orientation film, resulting in an excellent extinction position.

As a result of observing a change in the transmitted light amount with a change in applied voltage of the cell, the gradation was continuously changed from darkness to brightness or from brightness to darkness, thereby enabling a halftone display between brightness and darkness. Occurrence of a domain could not be recognized visually.

Both the substrates of this cell were separated from the cell and were left in an oven at 200° C. for 5 hours so that liquid crystal was volatilized. Thereafter, as a result of observing the substrates by the polarization microscope, it was ascertained that it was not polarized, and the resin form on the substrates was observed by an SEM. As a result, a large number of protrusions made of resin having a height of about 30 nm and a diameter of about 90 nm on average were observed.

Ninth Embodiment

In this embodiment, an example of the active matrix drive type liquid-crystal electro-optical device having a crystalline silicon TFT (thin-film transistor) as a switching element for each pixel will be described.

Formed on a silicon oxide film on a Corning 7059 glass plate (300×300 mm, thickness of 1.1 mm) as a substrate are pixel electrodes formed of ITO; an n-channel type crystalline silicon TFT having a mobility of 100 (cm$^2$/Vs) which is formed by crystallizing an amorphous silicon film by heating at 600° C. for 48 hours under a hydrogen reducing atmosphere, and wiring formed of a multi-layer film made of chromium and aluminum or made of aluminum whose surface has been subjected to anodic oxidation, and a matrix of 640×480 pixels.

Next, a film of ITO having a thickness of 1200 Å was formed on a soda-lime glass substrate by a sputtering method to provide a counter substrate. As the electrode material, SnO$_2$ (tin oxide) or the like can be also used. Further, as the substrate material, inorganic material such as glass or quartz, or organic material such as acrylic resin or polyethylene resin can be used.

An orientation film is formed on only the substrate on which the opposed electrode is formed to provide the so-called one-sided orientation. The orientation film material can be made of polyimide or polyamide resin, or resin such as polyvinyl alcohol. Polyimide resin is for example, LQ-5200 (made by Hitachi Kasei), LP-64 (made by Toray), RN-305 (made by Nissan Chemical) or the like, and in this embodiment, LP-64 was used. The orientation film was obtained by mixing the material with a solvent such as N-methyl-2-pyrolidone or the like and then coating the mixture on the substrates by a spin coating method. The coated substrate was heated at 250 to 300° C., in this embodiment, at 280° C. for 2.5 hours so that the solvent was dried and the coated film was imidized and cured. The thickness of the film after being cured was 300 Å.

For the purpose of optically uniaxially orienting the liquid-crystal material and arranging the layer of the liquid-crystal material normal to or inclined with respect to the substrates, the uniaxial orientation controlling force was given to the orientation film by a rubbing method. The rubbing operation was made likewise as in the usual way, that is, the orientation film was rubbed by a roller having a diameter of 130 mm on which cloth made of rayon, cotton or the like was wound at the rotational speed of 450 to 900 rpm, in this embodiment, 450 rpm in one direction. A roll pushing height was 0.1 mm and a stage speed was 20 mm/sec.

It is proper that a substrate interval is 1 to 10 μm, and a spacer material is silica, alumina or the like. In this embodiment, in order to maintain the cell gap constant, as a spacer, silica particles having a diameter of 1.5 μm were spread on a substrate at a side where the orientation film is coated. On another substrate, for the purpose of fixing two substrates, a two-liquid epoxy adhesive is printed and coated on the periphery of the substrate as a sealing agent through the screen printing method, and thereafter the two substrates fixedly adhered to each other.

The mixture of the liquid-crystal material and the uncured resin material was injected into the cell. The liquid-crystal material used in this embodiment is CS 1014 which is ferroelectric liquid-crystal made by Chisso Corporation. Ps of this liquid crystal is 5.4 nC/cm², and a phase series is I (isotropic phase)-N (nematic phase)-A (smectic A phase)-C*(smectic C* phase).

The resin material used in this embodiment is obtained by mixing commercially available acrylic monomers having the molecular weight of about 150 to 200 with urethane oligomers having the molecular weight of about 1500 to 3000 at the ratio of 90:10% by weight and then mixing them with a commercially available reaction initiating agent of about 3% by weight.

The liquid-crystal material and the uncured resin material were mixed with each other at the ratio of 95:5% by weight. The mixed resin was heated and stirred at 90° C. at which the liquid crystal exhibits the isotropic phase so as to be more mixed into the liquid-crystal material. As a result, the resin was uniformly mixed into the liquid-crystal material to provide a liquid-crystal mixture.

The cell and the liquid-crystal mixture were heated at 90° C., and then gradually cooled to the room temperature at 2 to 20° C./hr, in this embodiment, at 2° C./hr after the mixture was injected into the cell. After gradually cooling, the orienting state at the room temperature was observed by a polarization microscope. Although the resin material which was dotted in the cell and column-shaped could be recognized, the resin form on the substrates could not be recognized. However, the orientation of the liquid-crystal material, likewise as the liquid-crystal material to which no resin is added, was uniaxially oriented along a rubbing direction of the orientation film, resulting in an excellent extinction position.

Also, when the stage was turned by about 20° from the extinction state, there was no light leakage caused by birefringence in a field of view of a microscope, but black-state portions were dotted as they were. This exhibits that the resin is separated and deposited in the form of a column.

Ultraviolet radiation was applied to the cell in such a manner that an irradiation intensity is 3 to 30 mW/cm² and an irradiation time is 0.5 to 5 min, in this embodiment, 20 mW/cm² and 1 min, so that the resin is cured. After irradiation of ultraviolet radiation, the liquid crystal was also uniaxially oriented along the rubbing direction of the orientation film, thus obtaining an excellent extinction position. At this time, the resin in the form of a column allows the upper and lower substrates to adhere to each other so as to prevent a distance between the substrates from being enlarged, as a result of which, even though the liquid crystal is enlarged in area, the layer structure of the liquid-crystal material can be prevented from being destroyed.

The switching state of the cell thus manufactured was observed by a polarization microscope. As a result, in each of pixels, the amount of transmitted light was continuously changed without occurrence of a domain. Also, the gradation was uniform within a region of each pixel.

Polarizing plates were stuck on both the substrates, and a driving circuit is connected to the device to thereby complete a liquid-crystal electro-optical device. Rewrite on one screen is performed for 1/60 min, and the magnitude of applied voltage is controlled so that display with 256 gradations can be realized.

As a result of observing the substrates prepared by the above-mentioned method through SEM, a large number of fine protrusions having a height of several tens nm and a diameter of about several tens to several hundreds nm on both the surface of the orientation films and the surface of the pixel electrodes were observed.

In this embodiment, as the switching elements connected to the pixels, the n-channel type thin-film transistor was used. However, it may be of the p-channel type, or constituted by a complementary type using the p-channel type thin-film transistor and the n-channel type thin-film transistor. Also, it may be of a structure using a non-linear element and a thin-film diode such as an MIM diode or the like.

Also, in this embodiment, the number of pixels may be set to 1920×480, and there may be provided color filters of three colors consisting of red, blue and green so that full-color display of 640×480 can be performed. If it is 256 gradations, colors of about 1670 ten thousands can be displayed.

Comparative Example 1

This comparative example shows an example in which uncured resin material was not mixed in the cell shown in the sixth embodiment.

The orienting state of the liquid-crystal material of the cell formed was observed under a polarization microscope. As a result, the liquid-crystal material was optically uniaxially oriented along the rubbing direction of the orientation film, resulting in an excellent extinction position.

As a result of observing a change in the amount of transmitted light with a change of applied voltage of the cell, switching with only two states of brightness and darkness with occurrence of a domain was conducted, and the amount of transmitted light was not continuously changed.

After ultraviolet radiation having an intensity of 20 mW/cm², which is the same as that in the sixth embodiment, and 1 min was applied to the cell, a change in the amount of transmitted light was observed while applied voltage was changed. Similarly, switching with only two states of brightness and darkness followed by a domain was made.

Comparative Example 2

An example in which resin was not cured in the cell shown in the sixth embodiment will be described.

Likewise as in the sixth embodiment, a cell was manufactured, and the mixture of the liquid-crystal material and the uncured resin was injected into the cell. As a result of observing the orienting state of the liquid-crystal material of the cell prepared under a polarization microscope, likewise as in the case where no resin is mixed, the liquid-crystal material was uniaxially oriented along the rubbing direction of the orientation film, resulting in an excellent extinction position.

As a result of observing a change in the amount of transmitted light as applied voltage is changed under the condition where the resin is not cured by not applying ultraviolet radiation to the cell, switching with only two states of brightness and darkness with occurrence of a domain was conducted, and the amount of transmitted light was not continuously changed.

Although the surface of the substrate of the cell was observed through SEM in the same manner as in the sixth embodiment, no protrusions constituted by resin was observed.

Comparative Example 3

In this comparative example, an example in which the mixing ratio of the monomers and the oligomers in the resin material is made different from that in the cell shown in the sixth embodiment 6 will be described.

As the resin material used in this comparative example, uncured resin material was obtained by mixing acrylic monomers having the molecular weight of about 150 to 200 with urethane oligomers having the molecular weight of about 1500 to 3000 at the ratio of 10:90% by weight and then mixing them with a reaction initiating agent of about 3% by weight.

As a result of observing the orienting state of the liquid-crystal material of the cell prepared under a polarization microscope, likewise as in the case where no resin is mixed, the liquid-crystal material was uniaxially oriented along the rubbing direction of the orientation film, resulting in an excellent extinction position.

Ultraviolet radiation was applied to the cell in such a manner that an irradiation intensity is 3 to 30 mW/cm$^2$ and an irradiation time is 0.5 to 5 min, in this comparative example, 20 mW/cm$^2$ and 1 min, so that the resin is cured. After irradiation of ultraviolet radiation, the liquid crystal was also uniaxially oriented along the rubbing direction of the orientation film, thus obtaining an excellent extinction position. As a result of observing a change in the amount of transmitted light with a change of applied voltage of the cell, switching with only two states of brightness and darkness with occurrence of a domain was conducted, and the amount of transmitted light was not continuously changed.

Although the surface of the substrate of the cell was observed by an SEM, likewise as in the sixth embodiment, protrusions constituted by resin as in the sixth embodiment was not almost observed, and the state of the surface was very flat.

As described above, the liquid-crystal electro-optical device in accordance with the present invention can perform high speed, multi-gradation, high resolution, low-voltage drive and an increase of its area, and also such an device can be readily manufactured. Further, the present invention can provide the liquid-crystal electro-optical device which is satisfactorily excellent and proper for a display unit which displays high-quality image such as high vision or the like.

In the above-mentioned embodiments, ferroelectric liquid crystal is used, however, antiferroelectric liquid crystal can be also used likewise.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A liquid crystal device comprising:
a pair of substrates;
an orientation control film formed over at least one of the pair of substrates;
a liquid crystal layer between the pair of substrates; and
a resin interposed between the liquid crystal layer and the orientation control film,
wherein the resin comprises a plurality of grains.

2. The liquid crystal device of claim 1, wherein the orientation control film has an uniaxial orientation.

3. The liquid crystal devices of claim 1, wherein the resin is precipitated from a mixture of an UV curable resin and a liquid crystal irradiated by an UV light.

4. The liquid crystal device of claim 1, wherein the liquid crystal has a smectic phase.

5. A liquid crystal device comprising:
a pair of substrates;
an orientation control film formed over at least one of the pair of substrates;
a liquid crystal layer between the pair of substrates; and
a resin interposed between the liquid crystal layer and the orientation control film,
wherein the resin comprises a plurality of columns.

6. The liquid crystal device of claim 1, wherein the resin comprises an UV curable resin irradiated by an UV light.

7. The liquid crystal device of claim 5, wherein the orientation control film has an uniaxial orientation.

8. The liquid crystal device of claim 5, wherein the resin comprises an UV curable resin irradiated by an UV light.

9. The liquid crystal device of claim 5, wherein the resin contains a reaction initiator for an UV light.

10. The liquid crystal devices of claim 5, wherein the resin is precipitated from a mixture of an UV curable resin and a liquid crystal irradiated by an UV light.

11. The liquid crystal device of claim 5, wherein the liquid crystal has a smectic phase.

12. A liquid crystal device comprising:
a pair of substrates;
an orientation film formed between the pair of substrates; and
a liquid crystal layer between one of the pair of substrates and the orientation film;
wherein a plurality of resin grains are disposed on a surface of the orientation film and are in contact with the liquid crystal layer.

13. The liquid crystal device of claim 1, wherein the resin contains a reaction initiator for an UV light.

14. The liquid crystal device of claim 12, wherein the orientation film has an uniaxial orientation.

15. The liquid crystal device of claim 12, wherein the plurality of resin grains contains a reaction initiator for an UV light.

16. The liquid crystal device of claim 12, wherein the liquid crystal has a smectic phase.

17. The liquid crystal device of claim 12, wherein the plurality of resin grains contain a reaction initiator for an UV light.

18. The liquid crystal device of claim 12, wherein the orientation film is formed from a resin that is different from the plurality of resin grains.

19. The liquid crystal device of claim 12, wherein the liquid crystal device is configured to be driven in a TN mode or an STN mode.

20. The liquid crystal device of claim 12, wherein the liquid crystal layer comprises a ferroelectric liquid crystal or an antiferroelectric liquid crystal.

21. A liquid crystal device comprising:
a pair of substrates;
a first orientation film between the pair of the substrates;
a liquid crystal layer between the first orientation film and one of the pair of substrates; and
a second orientation film between the liquid crystal layer and another of the pair of substrates,
wherein a first plurality of resin grains are disposed on a surface of the first orientation film and are in contact with the liquid crystal layer, and
wherein a second plurality of resin grains are disposed on a surface of the second orientation film and are in contact with the liquid crystal layer.

22. The liquid crystal device of claim 21, wherein the orientation film has an uniaxial orientation.

23. The liquid crystal device of claim 21, wherein each of the first plurality of resin grains and the second plurality of resin grains comprises an UV curable resin irradiated by an UV light.

24. The liquid crystal device of claim 21, wherein the resin contains a reaction initiator for an UV light.

25. The liquid crystal devices of claim 21, wherein each of the first plurality of resin grains and the second plurality of resin grains is precipitated from a mixture of an UV curable resin and a liquid crystal irradiated by an UV light.

26. The liquid crystal device of claim 21, wherein the liquid crystal has a smectic phase.

27. The liquid crystal device of claim 21, wherein the first orientation film and the second orientation film are formed from a resin that is different from the first plurality of resin grains.

28. The liquid crystal device of claim 21, wherein the liquid crystal device is configured to be driven in a TN mode or an STN mode.

29. The liquid crystal device of claim 21, wherein a liquid crystal layer comprises a ferroelectric liquid crystal or an antiferroelectric liquid crystal.

* * * * *